US012587021B2

(12) United States Patent (10) Patent No.: US 12,587,021 B2
Liu (45) Date of Patent: Mar. 24, 2026

(54) VERSATILE BATTERY CHARGING SYSTEM AND CONTROL METHOD

(71) Applicant: Halo Microelectronics International, Campbell, CA (US)

(72) Inventor: Rui Liu, Fremont, CA (US)

(73) Assignee: Halo Microelectronics International, Campbell, CA (US)

( * ) Notice: Subject to any disclaimer, the term of this patent is extended or adjusted under 35 U.S.C. 154(b) by 1191 days.

(21) Appl. No.: 17/475,875

(22) Filed: Sep. 15, 2021

(65) Prior Publication Data

US 2023/0089638 A1 Mar. 23, 2023

(51) Int. Cl.
*H02J 7/00* (2006.01)
*H02M 3/07* (2006.01)

(52) U.S. Cl.
CPC ........ *H02J 7/00047* (2020.01); *H02J 7/0013* (2013.01); *H02J 7/007* (2013.01); *H02M 3/07* (2013.01); *H02J 2207/20* (2020.01)

(58) Field of Classification Search
CPC ...................................................... H02M 3/07
See application file for complete search history.

(56) References Cited

U.S. PATENT DOCUMENTS

| | | | | |
|---|---|---|---|---|
| 9,998,010 B1 * | 6/2018 | Ibrahim | .................. | H02M 3/07 |
| 11,424,629 B1 * | 8/2022 | Han | .................... | H01M 10/441 |
| 11,431,185 B1 * | 8/2022 | Feng | ...................... | H02J 7/007 |

| | | | | |
|---|---|---|---|---|
| 11,451,151 B1 * | 9/2022 | Liu | .......................... | H02M 3/07 |
| 11,502,535 B2 * | 11/2022 | Tian | ....................... | H02M 3/07 |
| 11,509,146 B1 * | 11/2022 | Zhang | ................. | H02J 7/00714 |
| 11,588,391 B1 * | 2/2023 | Liu | .......................... | H02M 3/07 |
| 11,677,260 B2 * | 6/2023 | Li | ............................ | H02J 7/342 |
| | | | | 320/116 |
| 11,750,093 B1 * | 9/2023 | Han | ........................ | H02M 3/07 |
| | | | | 363/13 |
| 11,784,577 B2 * | 10/2023 | Li | ......................... | H02M 3/158 |
| | | | | 363/74 |
| 12,101,020 B2 * | 9/2024 | Huang | ................ | H02M 3/1582 |
| 2008/0083936 A1 * | 4/2008 | Huynh | .................. | G06F 30/392 |
| | | | | 716/120 |
| 2008/0086710 A1 * | 4/2008 | Huynh | .................. | G06F 30/392 |
| | | | | 716/119 |
| 2008/0157723 A1 * | 7/2008 | Xing | ......................... | H02J 7/02 |
| | | | | 320/164 |
| 2009/0322384 A1 * | 12/2009 | Oraw | ...................... | H02M 3/07 |
| | | | | 327/112 |
| 2014/0268946 A1 * | 9/2014 | Liu | ......................... | H02M 3/07 |
| | | | | 363/60 |
| 2018/0013303 A1 * | 1/2018 | Wu | ............................ | H02J 7/02 |
| 2018/0083470 A1 * | 3/2018 | Aldehayyat | ......... | H02M 3/1582 |
| 2020/0076222 A1 * | 3/2020 | Yang | ........................ | H02J 7/02 |
| 2020/0212702 A1 * | 7/2020 | Fan | ....................... | H02M 3/158 |

(Continued)

*Primary Examiner* — Tynese V McDaniel
(74) *Attorney, Agent, or Firm* — AP3 Law Firm PLLC

(57) ABSTRACT

A battery charging system includes a buck switching converter configured to operate in either a buck mode or a boost mode depending on a system reconfiguration, a linear charger having a first terminal and a second terminal, wherein at least one terminal of the first terminal and the second terminal of the linear charger is used for the system reconfiguration, and a switched capacitor converter configured to operate in either a 2:1 charge pump mode or a 1:2 reverse charge pump mode depending on the system reconfiguration.

25 Claims, 13 Drawing Sheets

(56) References Cited

U.S. PATENT DOCUMENTS

| | | | |
|---|---|---|---|
| 2021/0091679 A1* | 3/2021 | Li | H03F 1/0227 |
| 2021/0213842 A1* | 7/2021 | Lee | B60L 58/40 |
| 2021/0281085 A1* | 9/2021 | Lee | H02J 7/0019 |
| 2021/0359606 A1* | 11/2021 | Han | H02M 1/0054 |
| 2021/0367511 A1* | 11/2021 | Liu | H02M 3/01 |
| 2021/0376622 A1* | 12/2021 | Guo | H01M 10/44 |
| 2022/0149644 A1* | 5/2022 | Liu | H02J 7/0068 |
| 2022/0231518 A1* | 7/2022 | Kun | H02M 3/07 |
| 2022/0337078 A1* | 10/2022 | Shao | H02M 3/07 |
| 2022/0376603 A1* | 11/2022 | Liu | H02M 1/0095 |
| 2022/0376625 A1* | 11/2022 | Liu | H02M 1/0095 |
| 2023/0026736 A1* | 1/2023 | Liu | H02M 1/0095 |
| 2023/0047446 A1* | 2/2023 | Liu | H02J 7/0016 |
| 2023/0126760 A1* | 4/2023 | Liu | H05K 1/0231 |
| | | | 323/271 |
| 2023/0142751 A1* | 5/2023 | Cho | H02J 1/06 |
| | | | 320/107 |
| 2023/0283096 A1* | 9/2023 | Kun | H02J 50/10 |
| | | | 320/140 |
| 2024/0047985 A1* | 2/2024 | Giuliano | H02J 7/02 |
| 2024/0146087 A1* | 5/2024 | Li | H02J 7/0047 |
| 2024/0204658 A1* | 6/2024 | Phadke | H02M 1/14 |

* cited by examiner

VIN

VBAT

VSYS

Battery Charging
System

350

Dual-phase switched capacitor charger Controller

CC & CV Mode Controller

Buck Switching Charger Controller

Power Path Controller

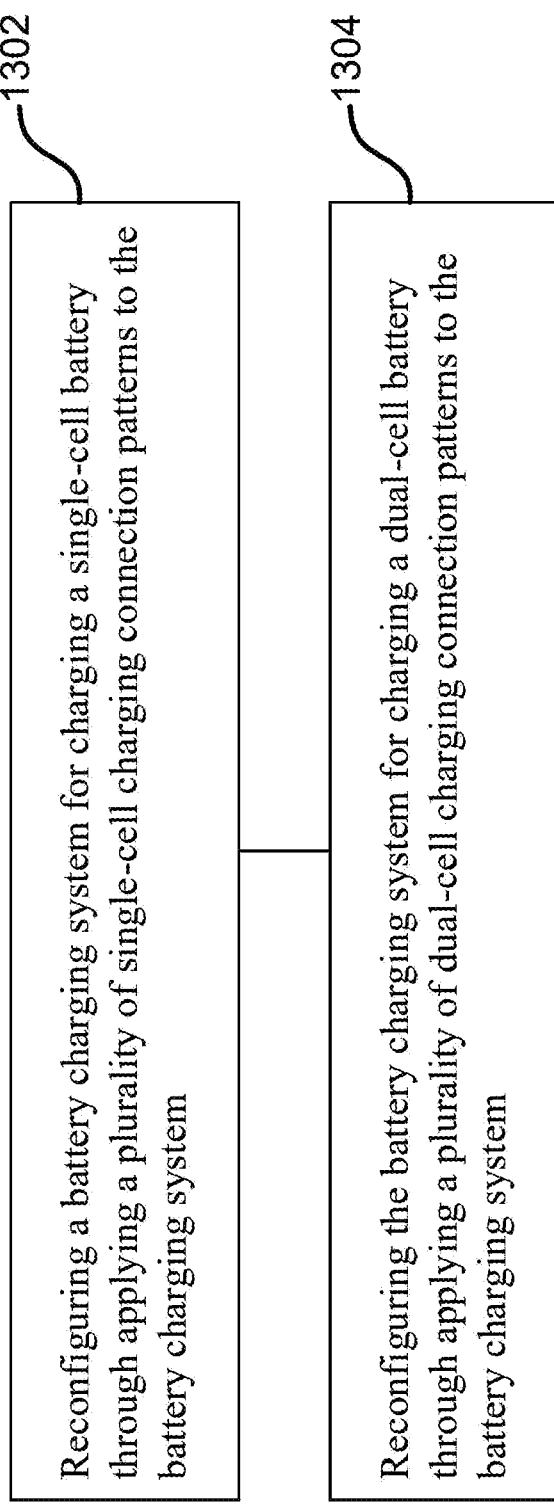

1302

Reconfiguring a battery charging system for charging a single-cell battery through applying a plurality of single-cell charging connection patterns to the battery charging system

1304

Reconfiguring the battery charging system for charging a dual-cell battery through applying a plurality of dual-cell charging connection patterns to the battery charging system

Figure 13

VERSATILE BATTERY CHARGING SYSTEM AND CONTROL METHOD

TECHNICAL FIELD

The present invention relates to a versatile battery charging system, and, in particular embodiments, to a battery charging system capable of charging a variety of batteries.

BACKGROUND

As technologies further advance, a variety of portable devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the plurality of rechargeable battery cells. The battery charger is controlled to provide voltage (e.g., a constant voltage charging mode) and current (e.g., a constant current charging mode) to the plurality of rechargeable battery cells so as to restore energy to the battery.

As power consumption has become more important, there may be a need for reducing the length of time to charge the battery. Fast charging has emerged as a veritable solution to satisfy the ever-changing demand from consumers. In a fast charging system, a switched capacitor converter is employed to deliver high current to the battery while keeping the input current (e.g., USB cable current) low. The switched capacitor converter has various advantages such as monolithic integration of the converter without external inductors, high power conversion efficiency and the like. The switched capacitor converter is capable of achieving a safe and quick charging of large-capacity batteries.

FIG. 1 illustrates a single-cell battery charging system. The single-cell battery charging system 100 comprises two power stages connected in parallel. A first power stage is a switched capacitor charger 130. A second power stage is a switching charger 110. The switched capacitor charger 130 is preferred to be used to provide power to a battery 150 during the constant current charging mode, while the switching charger 110 is more commonly used to provide power to the battery 150 during the constant voltage charging mode to complete the charging.

The switched capacitor charger 130 is implemented as a dual-phase switched capacitor converter. A first phase includes switches 134, 135, 136 and 137 connected in series between an input voltage bus 143 and ground. A first flying capacitor 154 is connected between a common node of switches 134 and 135, and a common node of switches 136 and 137. A common node of the switches 135 and 136 is connected to an output voltage bus VBAT connected to the battery 150 and an output capacitor 157. The battery 150 and the output capacitor 157 are connected in parallel.

A second phase includes switches 139, 140, 141 and 142 connected in series between the input voltage bus 143 and ground. A second flying capacitor 155 is connected between a common node of switches 139 and 140, and a common node of switches 141 and 142. A common node of the switches 140 and 141 is connected to the output voltage bus VBAT. As shown in FIG. 1, the output voltage bus VBAT is connected to the battery 150 and the output capacitor 157.

A dual-phase switched capacitor charger controller 138 is configured to generate gate drive signals for switches 134-137 and 139-142. An input capacitor 156 is coupled between the input voltage bus 143 and ground. The input voltage bus 143 is coupled to an input voltage source VIN through a linear charger 131 and a switch 111. As shown in FIG. 1, the linear charger 131 comprises an n-type transistor 132 and a controller 133.

The switching charger 110 is implemented as a step-down power converter. The switching charger 110 includes switches 112 and 114 connected in series between an input voltage bus 118 and ground. An inductor 115 is connected between a common node of switches 112 and 114, and an output voltage bus VSYS. An output capacitor 153 is connected between the output voltage bus VSYS and ground. A buck switching charger controller 113 is configured to generate gate drive signals for switches 112 and 114.

An input capacitor 152 is coupled between the input voltage bus 118 and ground. The input voltage bus 118 is coupled to the input voltage source VIN through the switch 111. The buck switching charger controller 113 is also configured to generate a gate drive signal for switch 111. The switch 111 is employed to provide reverse protection. In particular, the switch 111 is configured to connect the switching charger 110 and switched capacitor charger 130 to the input power source VIN or disconnect the switching charger 110 and the switched capacitor charger 130 from the input power source VIN.

The output voltage bus VSYS is coupled to the battery 150 through a switch 117. The switch 117 is implemented as an isolation switch. In particular, the switch 117 provides isolation between the load (e.g., the battery 150) and the output voltage bus VSYS. As shown in FIG. 1, the bulk terminal of the switch 117 is not connected to the source of the switch 117. The switch 117 includes two diodes. A first diode is between the bulk terminal and the source of the switch 117. A second diode is between the bulk terminal and the drain of the switch 117. These two diodes are back-to-back connected. As a result of having the back-to-back connected diodes, the switch 117 functions as the isolation switch. A power path controller 116 is configured to generate a gate drive signal for the switch 117. The switch 117 is employed to connect the battery 150 to the switching charger 110 or disconnect the battery 150 from the switching charger 110. The power path controller 116 and the switch 117 are collectively referred to as a power path management block 119.

In operation, when the battery 150 is charged under a constant current mode, the switched capacitor charger 130 is enabled, and the switching charger 110 is disabled. The switched capacitor charger 130 provides power to the battery 150. As the battery voltage increases beyond a certain threshold (e.g., 4.2 V), the battery enters into a constant voltage mode during which, either the switched capacitor charger 130 or the switching charger 110 can be used to charge the battery 150. At the beginning of the constant voltage charging mode, the switched capacitor charger 130 is used to provide power for the battery 150. The charging current reduces as the battery voltage rises. After the charging current drops below a certain threshold (e.g., 2A), the switching charger 110 is then used to provide a constant voltage for the battery 150 to complete the battery charging process.

In operation, the power path management block 119 manages the charging process of the battery 150 under all charging modes including a pre-charging (Pre-Q) mode, a constant Current (CC) mod and a Constant Voltage (CV) mode. The voltage rating of the power path management block 119 is about 5 V.

In operation, the switching charger 110 operates in a buck conversion mode in most times. Depending different designs, the switching charger 110 can operate in a reverse boost conversion mode to power up the VIN terminal from the battery 150 when the USB On-The-Go (OTG) operation is requested.

In operation, the voltage on VBAT is equal to one half of the input voltage of the switched capacitor converter. The switched capacitor converter is able to operate in either a 2:1 charge pump mode or a 1:2 reverse charge pump mode. When fast charging a single-cell battery is required, the switched capacitor converter is configured to operate in the 2:1 charge pump mode. The switched capacitor converter is capable of operating in a reverse 1:2 reverse charge pump mode to boost the voltage on the bus 143. The voltage on the bus 143 is equal to twice the battery voltage of the battery 150. It should be noted that the reverse charge pump mode (1:2 reverse charge pump mode) operation is prohibited in the single-cell battery charging applications FIG. 2 illustrates a dual-cell battery charging system. The dual-cell battery charging system 200 comprises two power converters connected in cascade between a first voltage bus VIN and a second voltage bus VBAT. A first power converter 210 is a buck switching converter. A second power converter 230 is a switched capacitor converter. As shown in FIG. 2, the switched capacitor converter 230 is implemented as a dual-phase switched capacitor converter. A first phase includes switches 234, 235, 236 and 237 connected in series between the second voltage bus VBAT and ground. A first flying capacitor 254 is connected between a common node of switches 234 and 235, and a common node of switches 236 and 237. A common node of the switches 235 and 236 is connected to a third voltage bus BAT. A second phase includes switches 239, 240, 241 and 242 connected in series between the second voltage bus VBAT and ground. A second flying capacitor 255 is connected between a common node of switches 239 and 240, and a common node of switches 241 and 242. A common node of the switches 240 and 241 is connected to the third voltage bus BAT. As shown in FIG. 2, a capacitor 256 is connected between the third voltage bus BAT and ground.

A dual-phase switched capacitor charger controller 238 is configured to generate gate drive signals for driving switches 234-237 and 239-242. A capacitor 257 is coupled between the second voltage bus VBAT and ground.

The first power converter 210 is implemented as a step-down power converter. The first power converter 210 includes switches 212 and 214 connected in series between an input voltage bus VB and ground. An inductor 215 is connected between a common node of switches 212 and 214, and a system voltage bus VSYS. An output capacitor 253 is connected between the system voltage bus VSYS and ground. A buck switching charger controller 213 is configured to generate gate drive signals for driving switches 212 and 214.

An input capacitor 252 is coupled between the input voltage bus VB and ground. The input voltage bus VB is coupled to the first voltage bus VIN through a switch 211. The switch 211 is also controlled by the buck switching charger controller 213. The switch 211 is employed to connect the first power converter 210 to the first voltage bus VIN or disconnect the first power converter 210 from the first voltage bus VIN. In addition, the switch 211 is able to provide a current limiting protection.

The third voltage bus BAT is coupled to the system voltage bus VSYS through a switch 217. The switch 217 is implemented as an isolation switch. In particular, the switch 217 provides isolation between the third voltage bus BAT and the system voltage bus VSYS. As shown in FIG. 2, the bulk terminal of the switch 217 is not connected to the source of the switch 217. The switch 217 includes two diodes. A first diode is between the bulk terminal and the source of the switch 217. A second diode is between the bulk terminal and the drain of the switch 217. These two diodes are back-to-back connected as shown in FIG. 2. As a result of having the back-to-back connected diodes, the switch 217 functions as the isolation switch. A power path controller 216 is configured to generate a gate drive signal for driving the switch 217. The switch 217 is employed to connect the third voltage bus BAT to the first power converter 210 or disconnect the third voltage bus BAT from the first power converter 210.

In operation, when a 5-V power source is provided at the first voltage bus VIN, the dual-phase switched capacitor converter 230 operates in a 1:2 reverse charge pump mode. The input of the dual-phase switched capacitor converter 230 receives power from the third voltage bus BAT to charge a dual-cell battery coupled to the second voltage bus VBAT. The third voltage bus BAT is connected to the output of the buck switching converter 210 through the switch 217. The desired dual-cell charging voltage is achieved by regulating the output (VSYS and BAT) of the buck switching converter 210, and then the voltage on BAT is doubled by the dual-phase switched capacitor converter 230. This power delivery path is applicable to both the constant current mode (CCM) and the constant voltage mode (CVM). Pre-charging is achieved through configuring the switch 217 to operate in a constant current mode and regulating VSYS to a voltage level equal to the minimum system voltage.

In operation, when there is no voltage present at the first voltage bus VIN, the dual-phase switched capacitor converter 230 operates in a 2:1 charge pump mode to discharge the battery so as to maintain the system supply (VSYS) through turning on the switch 217.

As power consumption has become more important, there may be a need for simplifying the battery charging systems shown in FIGS. 1-2. It is desirable to have versatile battery charging system. In particular, a battery charging system can charge either a single-cell battery or a dual-cell battery.

SUMMARY

These and other problems are generally solved or circumvented, and technical advantages are generally achieved, by preferred embodiments of the present disclosure which provide a versatile battery charging system.

In accordance with an embodiment, a battery charging system comprises a buck switching converter configured to operate in either a buck mode or a boost mode depending on a system reconfiguration, a linear charger having a first terminal and a second terminal, wherein at least one terminal of the first terminal and the second terminal of the linear charger is used for the system reconfiguration, and a switched capacitor converter configured to operate in either a 2:1 charge pump mode or a 1:2 reverse charge pump mode depending on the system reconfiguration.

In accordance with another embodiment, a method comprises reconfiguring a battery charging system for charging a single-cell battery through applying a plurality of single-cell charging connection patterns to the battery charging system, and reconfiguring the battery charging system for charging a dual-cell battery through applying a plurality of dual-cell charging connection patterns to the battery charging system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 13 illustrates a flow chart of a control method for the battery charger system shown in FIG. 3 in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a battery charging system capable of charging a variety of batteries including single-cell batteries and dual-cell batteries. The invention may also be applied, however, to a variety of power systems. Hereinafter, various embodiments will be explained in detail with reference to the accompanying drawings.

Figure 1:
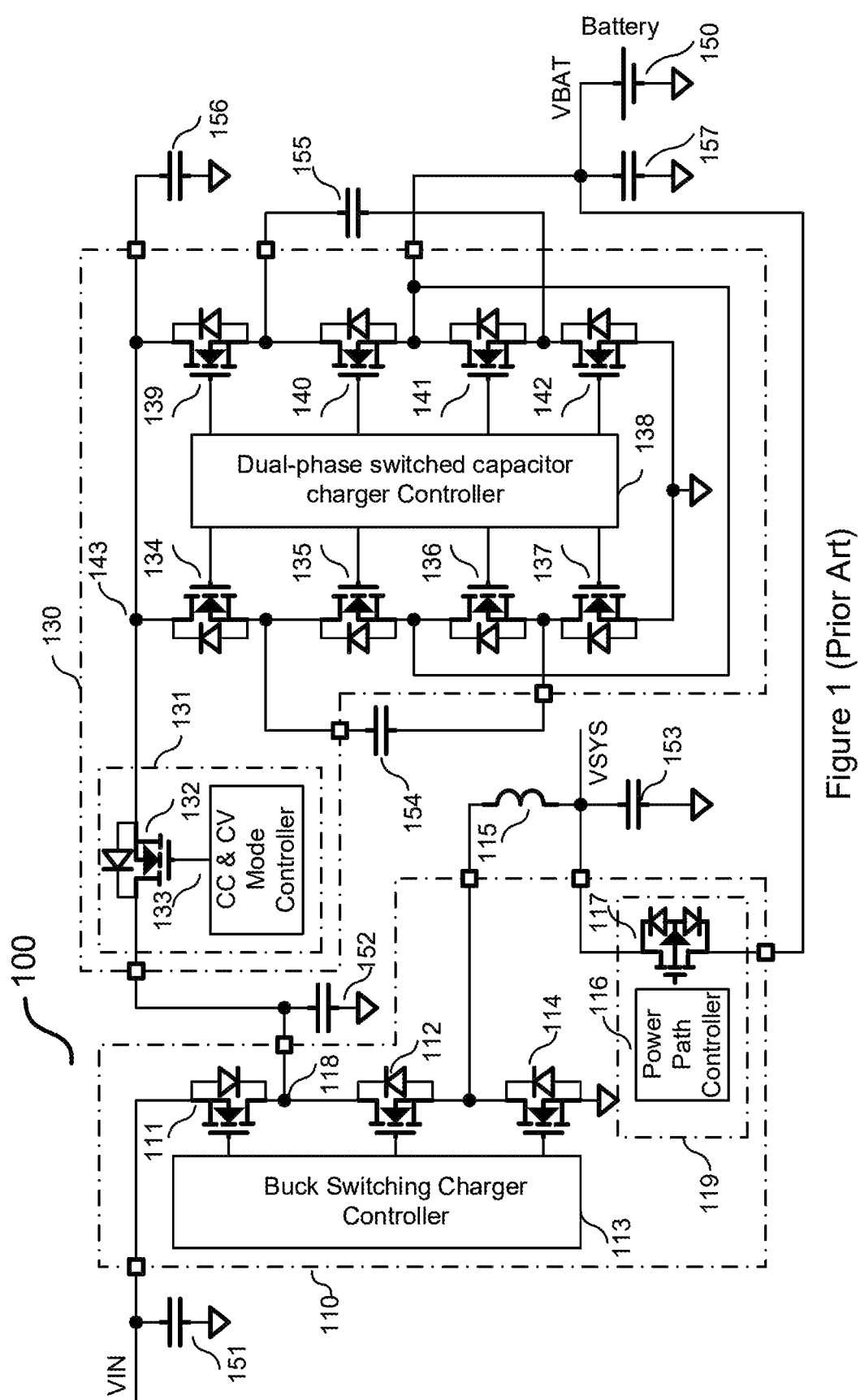
FIG. 1 illustrates a single-cell battery charging system.
Figure 2:
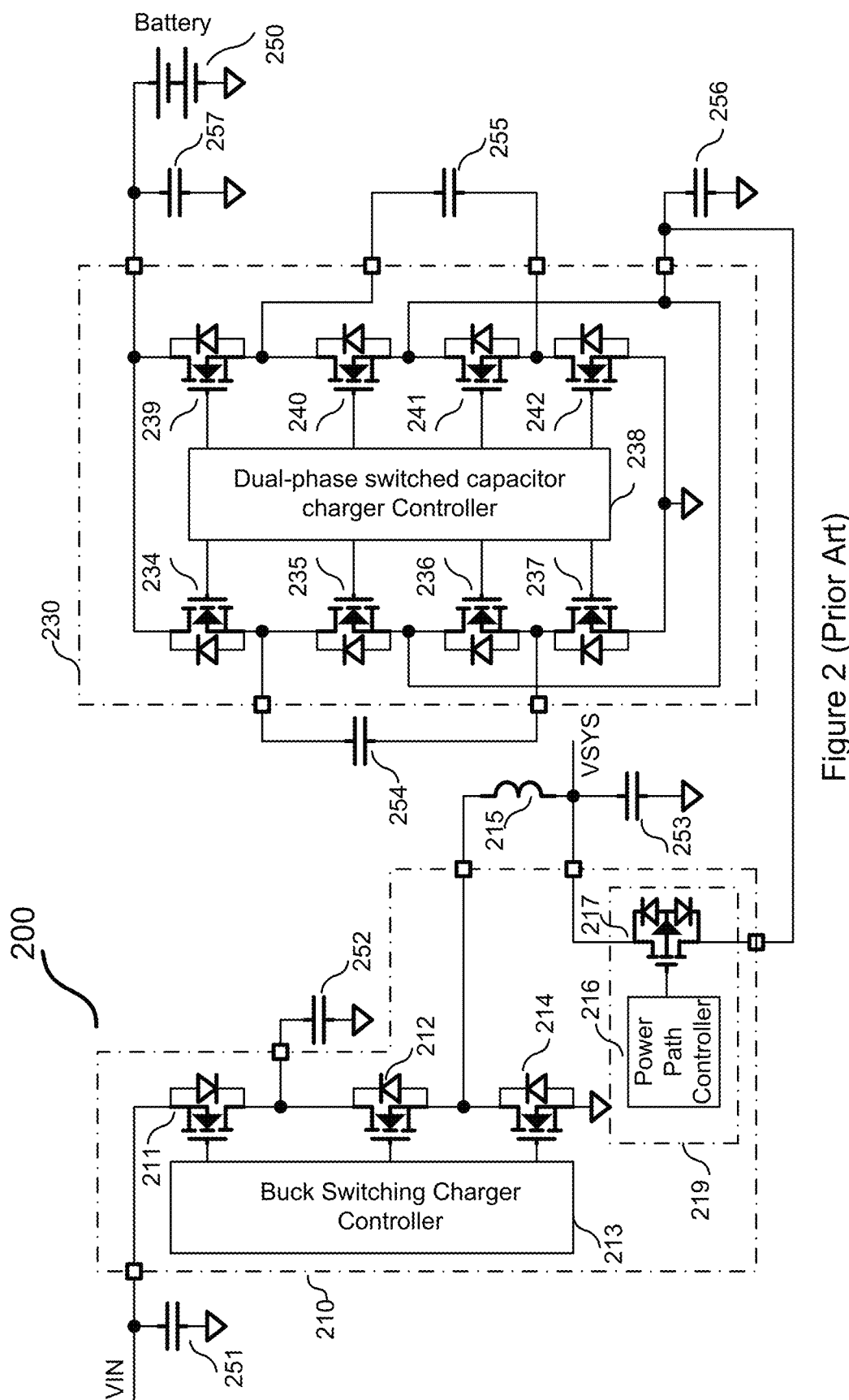
FIG. 2 illustrates a dual-cell battery charging system.
Figure 3:
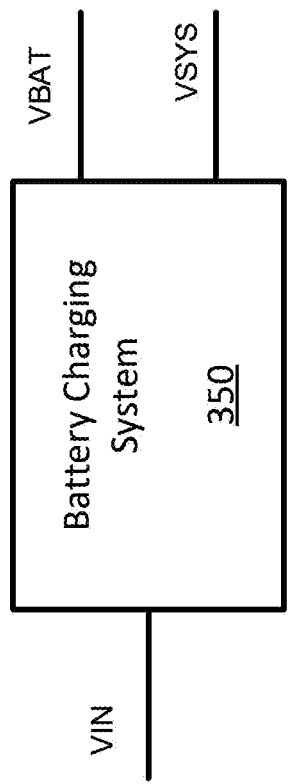
FIG. 3 illustrates a block diagram of a battery charging system in accordance with various embodiments of the present disclosure.

FIG. 3 illustrates a block diagram of a battery charging system in accordance with various embodiments of the present disclosure. The battery charging system 350 comprises a first terminal VIN, a second terminal VBAT and a third terminal VSYS. The first terminal VIN is configured to be coupled to a power source. The second terminal VBAT is configured to be coupled to a battery. In some embodiments, the battery is a single-cell battery. Alternatively, the battery is a dual-cell battery. The third terminal VSYS is configured to be coupled to a plurality of system loads of a mobile device (e.g., a mobile phone). The battery charging system 350 is a versatile battery charging system. In other words, through suitable system reconfigurations, the battery charging system 350 can be configured to charge either a single-cell battery or a dual-cell battery.

In some embodiments, the battery charging system 350 comprises a switch, a buck switching converter, a linear charger and a switched capacitor converter. The switch has a first terminal and a second terminal. The buck switching converter is configured to operate in either a buck mode or a boost mode depending on the system reconfiguration. The linear charger has a first terminal and a second terminal. At least one terminal of the first terminal and the second terminal of the linear charger is used for the system reconfiguration. The switched capacitor converter is configured to operate in either a 2:1 charge pump mode or a 1:2 reverse charge pump mode depending on different system reconfigurations.

In some embodiments, at least one terminal of the first terminal and the second terminal of the switch is used for a system reconfiguration.

In some embodiments, the switch and the switches of the buck switching converter are integrated on a first apparatus. In some embodiments, the first apparatus is a first integrated circuit configured to be mounted on a first printed circuit board (PCB). The linear charger and the switches of the switched capacitor converter are integrated on a second apparatus. In some embodiments, the second apparatus is a second integrated circuit configured to be mounted on a second PCB. The system configuration based on two PCB boards will be described in detail with respect to FIGS. 4-7. In alternative embodiments, the switch, the switches of the buck switching converter, the linear charger and the switches of the switched capacitor converter are integrated on a same apparatus. In some embodiments, the same apparatus is an integrated circuit configured to be mounted on a PCB. The system configuration based on one PCB will be described in detail with respect to FIGS. 9-12.

One advantageous feature of having the battery charging system 350 is the battery charging system is a versatile battery charging system capable of charging both the single-cell and dual-cell batteries with minor modifications in the PCB layout. As a result, this battery charging system eliminates the need to manage different battery charger device inventories. One PCB layout is suitable for both the single-cell and dual-cell battery charging through selecting different Bill of Materials (BOM).

Figure 4:
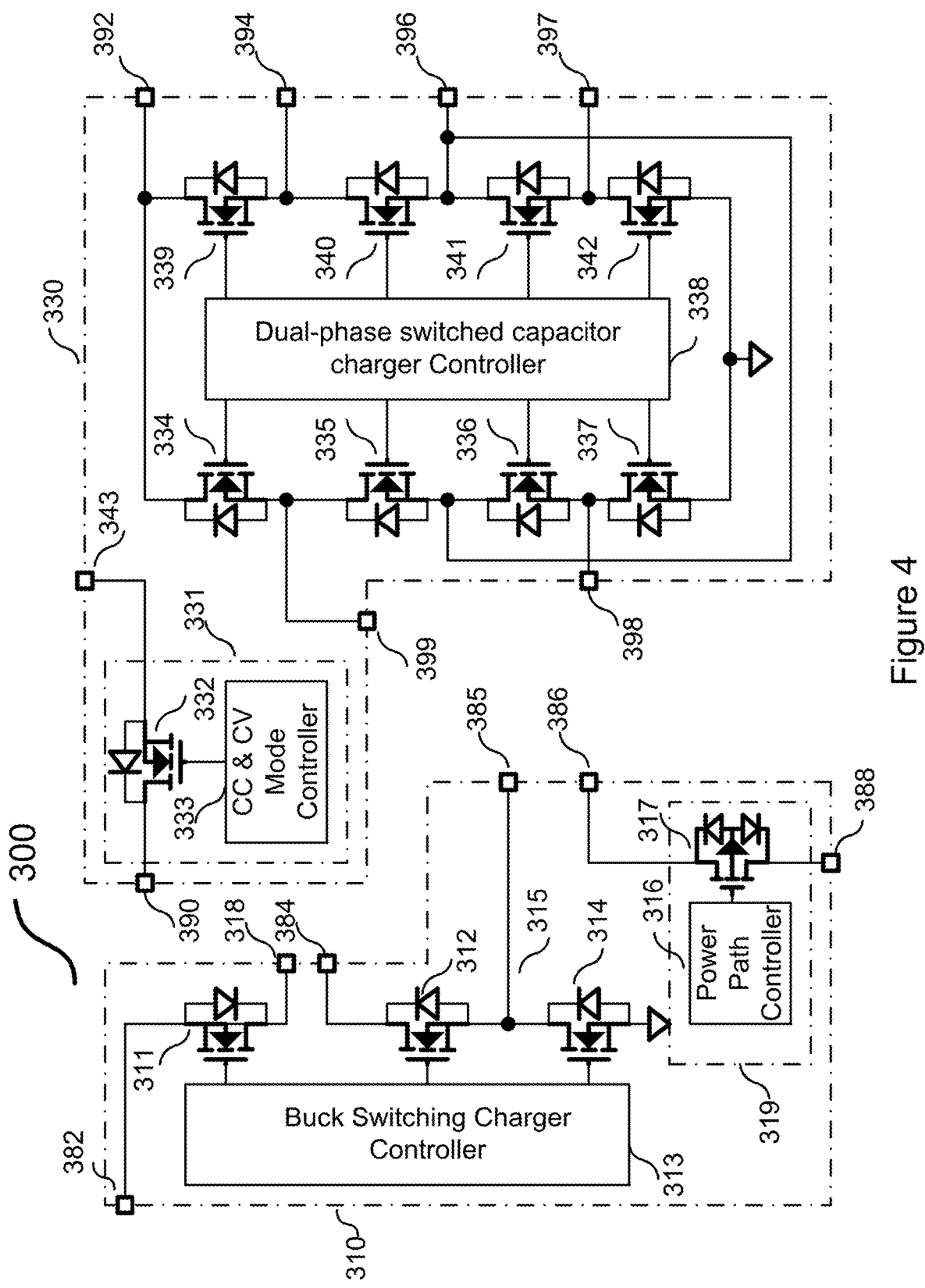
FIG. 4 illustrates a schematic diagram of a first system configuration of the battery charging system shown in FIG. 3 in accordance with various embodiments of the present disclosure.

FIG. 4 illustrates a schematic diagram of a first system configuration of the battery charging system shown in FIG. 3 in accordance with various embodiments of the present disclosure. The battery charging system 300 comprises a switch 311, a buck switching converter comprising switches 312, 314 and an inductor 315, a power path management block 319 comprising a switch 317 and a controller 316, a linear charger 331 comprising a switch 332 and a controller 333, and a switched capacitor converter comprising switches 334, 335, 336, 337, 339, 340, 341 and 342.

As shown in FIG. 4, the switch 311, the power path management block 319 and the switches of the buck switching converter are integrated on a first apparatus 310. Throughout the description, the first apparatus 310 may be alternatively referred to as a first subsystem 310. In some embodiments, the first apparatus 310 is a first integrated circuit configured to be mounted on a first PCB having a plurality of input/output terminals 382, 318, 384, 385, 386 and 388. The square symbols (e.g., 318) are the input/output terminals of the first PCB. Alternatively, the square symbols (e.g., 318) may be connection pins of the first integrated circuit.

As shown in FIG. 4, the linear charger 331 and the switches of the switched capacitor converter are integrated on a second apparatus 330. In some embodiments, the second apparatus 330 is a second integrated circuit configured to be mounted on a second PCB having a plurality of input/output terminals 390, 343, 392, 394, 396, 397, 398 and 399. The square symbols (e.g., 343) are the input/output terminals of the second PCB. Alternatively, the square symbols (e.g., 343) may be connection pins of the second integrated circuit. Throughout the description, the second apparatus 330 may be alternatively referred to as a second subsystem 330.

It should be noted that the first PCB and the second PCB described above may be two boards placed next to each other. Through suitable connections between the input/output terminals of these two boards, the circuits on these two boards can form a plurality of battery charging systems suitable for different applications and design needs. Alternatively, the first apparatus 310 and the second apparatus 330 may be different layout regions of a same PCB. Through suitable PCB interconnections between the input/output terminals of these two layout regions, the circuits on these two layout regions can form a plurality of battery charging systems suitable for different applications and design needs.

In operation, the battery charging system 300 is capable of charging both single-cell batteries and dual-cell batteries. The switched capacitor converter is able to operate in either a 2:1 charge pump mode or a 1:2 reverse charge pump mode. In addition, the switched capacitor converter is able to have a seamless transition between these two charge pump modes. The buck switching converter is capable of operating in a reverse boost conversion mode. In the reverse boost conversion mode, the buck switching converter is able to limit the current flowing through the output inductor.

In accordance with an embodiment, the switches of FIG. 4 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 4 shows the switches (e.g., switch 312) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 4 may be implemented as a plurality of switches connected in parallel. Moreover, a capacitor may be connected in parallel with one switch to achieve zero voltage switching (ZVS)/zero current switching (ZCS).

Figure 5:
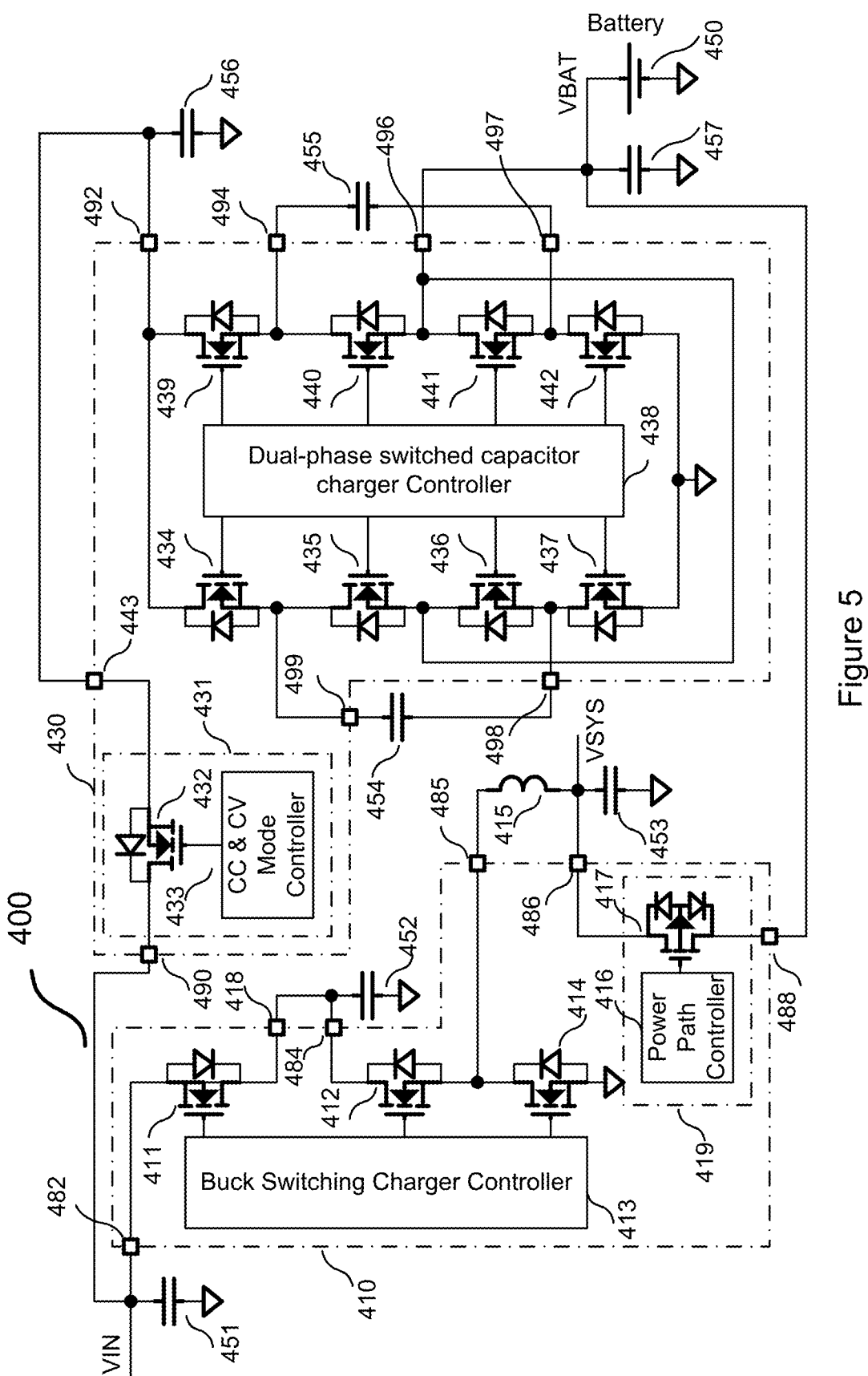
FIG. 5 illustrates a schematic diagram of an implementation of reconfiguring the battery charging system shown in FIG. 4 as a single-cell battery charger in accordance with various embodiments of the present disclosure.

FIG. 5 illustrates a schematic diagram of an implementation of reconfiguring the battery charging system shown in FIG. 4 as a single-cell battery charger in accordance with various embodiments of the present disclosure. The battery charging system 400 comprises a first subsystem 410 and a second subsystem 430. The first subsystem 410 comprises a switch 411, switches 412 and 414 of a buck switching converter, and a power path management block 419. As shown in FIG. 5, the power path management block 419 comprises a switch 417 and a power path controller 416. The first subsystem 410 further comprises a buck switching charger controller 413 configured to generate gate drive signals for switches 411, 412 and 414.

The first subsystem 410 further comprises a plurality of input/output terminals 418, 482, 484, 485, 486 and 488. As shown in FIG. 5, a capacitor 451 is connected between the input/output terminal 482 and ground. Two input/output terminals 418 and 484 are connected together and further coupled to a capacitor 452. A capacitor 453 is connected between an input/output terminal 486 and ground. An inductor 415 is connected between two input/output terminals 485 and 486. An input/output terminal 488 is connected to the battery 450 and a capacitor 457.

The second subsystem 430 comprises a linear charger 431, and switches 434, 435, 436, 437, 439, 440, 441 and 442 of a switched capacitor converter. As shown in FIG. 5, the linear charger 431 comprises a switch 432 and a controller 433. The second subsystem 430 further comprises a dual-phase switched capacitor charger controller 438 configured to generate gate drive signals for the switches of the switched capacitor converter.

The second subsystem 430 further comprises a plurality of input/output terminals 492, 494, 496, 497, 498, 499, 490 and 443. As shown in FIG. 5, a first flying capacitor 454 is connected between terminals 498 and 499. A second flying capacitor 455 is connected between terminals 494 and 497. Two input/output terminals 443 and 492 are connected together and further coupled to a capacitor 456. An input/output terminal 496 is connected to the battery 450 and the capacitor 457. An input/output terminal 490 is connected to the input/output terminal 482 and the capacitor 451.

As shown in FIG. 5, a first terminal (source) of the switch 411 is configured to be connected with a power source coupled to VIN. The second terminal (drain) of the switch 411 is configured to be connected with an input terminal of the buck switching converter. As shown in FIG. 5, the connection between the second terminal of the switch 411 and the input terminal of the buck switching converter is implemented through connecting two input/output terminals 418 and 484 using a suitable element (e.g., a connection wire/trace connected between the two input/output terminals). An output terminal of the buck switching converter is configured to be connected with the single-cell battery 450 through the switch 417. In some embodiments, the switch 417 is an isolation switch. A first terminal (drain of switch 432) of the linear charger 431 is configured to be connected with the power source. A second terminal (source of switch 432) of the linear charger 431 is configured to be connected with an input terminal of the switched capacitor converter. An output terminal of the switched capacitor converter is configured to be connected with the single-cell battery 450.

In operation, when the battery charging system 400 is configured to charge a single-cell battery, the first subsystem 410 is configured to operate in a buck switching charger mode and the power path management block 419 is enabled. The second subsystem 430 is configured to operate in a 2:1 charge pump mode. The second subsystem 430 is enabled only when the single-cell battery 450 is in a constant current fast charging mode or a constant voltage fast charging mode. Once the charging current is less than a predetermined value (e.g., 3A) in the constant voltage charging mode, the second subsystem 430 is turned off and the first subsystem 410 finishes the rest of the constant voltage mode charging.

Figure 6:
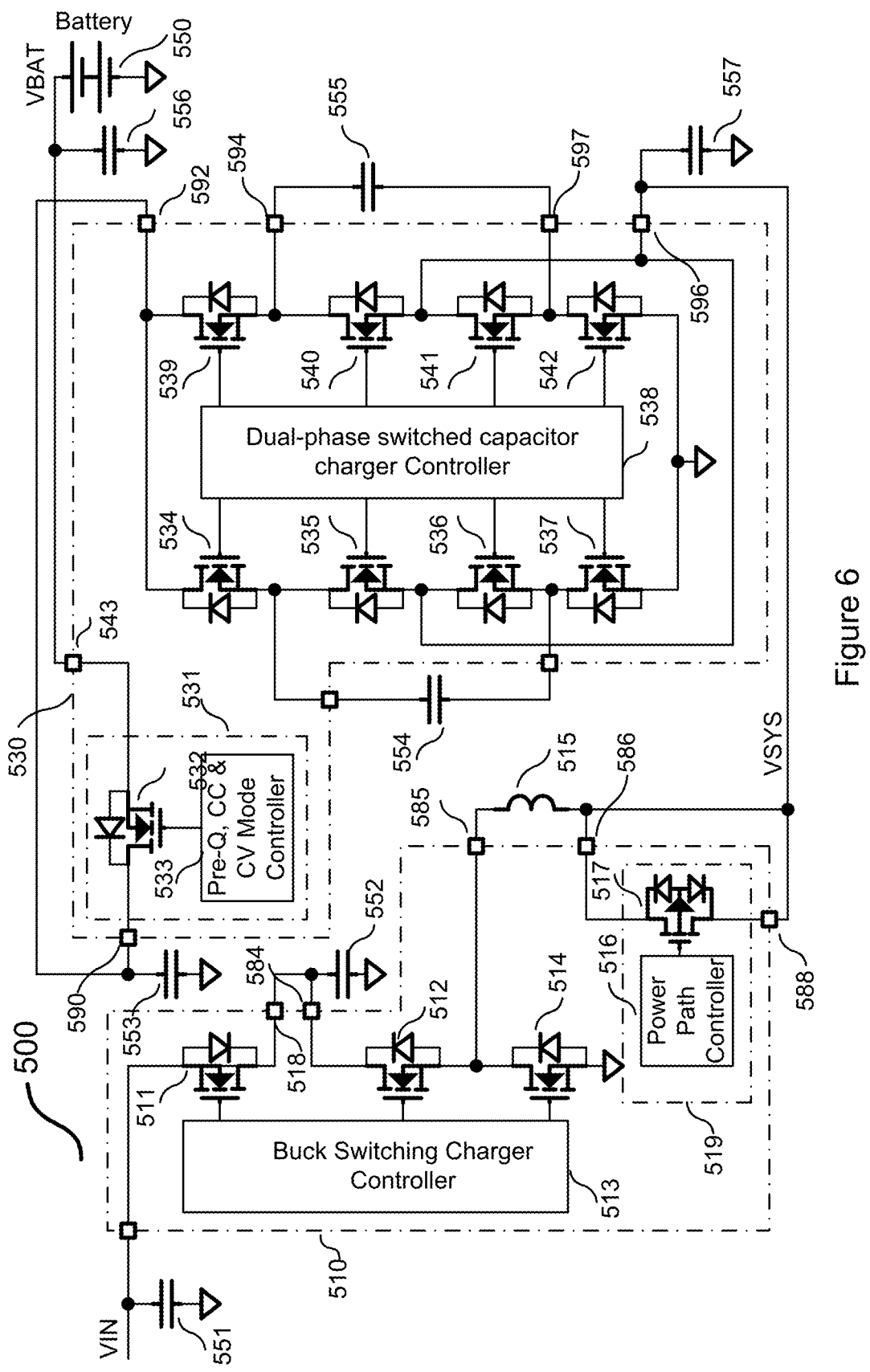
FIG. 6 illustrates a schematic diagram of a first implementation of reconfiguring the battery charging system shown in FIG. 4 as a dual-cell battery charger in accordance with various embodiments of the present disclosure.

FIG. 6 illustrates a schematic diagram of a first implementation of reconfiguring the battery charging system shown in FIG. 4 as a dual-cell battery charger in accordance with various embodiments of the present disclosure. The battery charging system 500 comprises a first subsystem 510 and a second subsystem 530. The first subsystem 510 comprises a switch 511, switches 512 and 514 of a buck switching converter, and a power path management block 519. As shown in FIG. 6, the power path management block 519 comprises a switch 517 and a power path controller 516.

The first subsystem 510 further comprises a buck switching charger controller 513 configured to generate gate drive signals for switches 511, 512 and 514. The first subsystem 510 comprises a plurality of input/output terminals 518, 582, 584, 585, 586 and 588. As shown in FIG. 6, a capacitor 551 is connected between the input/output terminal 582 and ground. Two input/output terminals 518 and 584 are connected together and further coupled to a capacitor 552. Two input/output terminals 586 and 588 are connected together. An inductor 515 is connected between two input/output terminals 585 and 586.

The second subsystem 530 comprises a linear charger 531 and switches 534, 535, 536, 537, 539, 540, 541 and 542 of a switched capacitor converter. As shown in FIG. 6, the linear charger 531 comprises a switch 532 and a controller 533. The second subsystem 530 further comprises a dual-phase switched capacitor charger controller 538 configured to generate gate drive signals for the switches of the switched capacitor converter.

The second subsystem 530 further comprises a plurality of input/output terminals 592, 594, 596, 597, 598, 599, 590 and 543. As shown in FIG. 6, a first flying capacitor 554 is connected between terminals 598 and 599. A second flying capacitor 555 is connected between terminals 594 and 597. Two input/output terminals 590 and 592 are connected together and further coupled to a capacitor 553. The input/output terminal 543 is connected to the dual-cell battery 550 and a capacitor 556. The input/output terminal 596 is connected to the input/output terminals 586, 588 and the capacitor 557.

As shown in FIG. 6, a first terminal (source) of the switch 511 is configured to be connected with a power source VIN. A second terminal (drain) of the switch 511 is configured to be connected with an input terminal of the buck switching converter. As shown in FIG. 6, the connection between the second terminal of the switch 511 and the input terminal of the buck switching converter is implemented through connecting two input/output terminals 518 and 584 using a suitable connection element (e.g., a connection wire/trace connected between the two input/output terminals in a PCB). An output terminal of the buck switching converter is configured to be connected with an output terminal of the switched capacitor converter. As shown in FIG. 6, the connection between the output terminal of the buck switching converter and the output terminal of the switched capacitor converter is implemented through connecting two input/output terminals 586 and 596 using a suitable connection element. A first terminal (drain of switch 532) of the linear charger is configured to be connected with an input terminal of the switched capacitor converter through connecting two input/output terminals 590 and 592 using a suitable connection element. A second terminal (source of switch 532) of the linear charger is configured to be connected with the dual-cell battery 550.

As shown in FIG. 6, VSYS is connected to the output of the buck switching converter through the input/output terminal 586. After the input/output terminals 586 and 588 have been connected together, the power path management block 519 is shorted. In other words, the power path management block 519 is disabled in this system configuration. As shown in FIG. 6, the output of the linear charger 531 is connected to the battery 550 directly. The input of the linear charger 531 is connected to an input filtering capacitor (capacitor 553) of the dual-phase switched capacitor converter.

In operation, when a power source is provided at VIN, the dual-phase switched capacitor converter operates in a 1:2 reverse charge pump mode. The input of the dual-phase switched capacitor converter receives power from the output of the buck switching converter to charge the dual-cell battery 550 through the linear charger 531. The voltage on VSYS is doubled by the dual-phase switched capacitor converter. The doubled voltage is fed into the dual-cell battery 550 through the linear charger 531. The desired dual-cell charging voltage is achieved by regulating the output (VSYS) of the buck switching converter. This power delivery path is applicable to both the constant current charging mode and the constant voltage charging mode. Pre-charging is achieved through configuring the linear charger 531 so as to control the charging current flowing through the dual-cell battery 550.

In operation, when there is no voltage present at VIN, the dual-phase switched capacitor converter operates in a 2:1 charge pump mode to discharge the dual-cell battery 550 so as to maintain the voltage on VSYS. The power from the dual-cell battery 550 is fed into VSYS through the linear charger 531 and the dual-phase switched capacitor converter.

It should be noted that a plurality of new features is included in the controllers of the battery charging system 500 in order to make the battery charging system 500 operate properly. First, the buck switching converter is able to operate in a reverse boost mode with an inductor current limit function. Second, the switched capacitor converter is able to have a seamless transition between the 2:1 charge pump mode and the 1:2 reverse charge pump mode depending on the charging status and system load conditions. Third, the controllers of the battery charging system 500 include a method to detect the battery configuration (e.g., a single-cell battery or a dual-cell battery) so that the battery charging system 500 can operate in an appropriate operation mode (e.g., a single-cell battery charging mode or a dual-cell battery charging mode). Fourth, the linear charger 531 is able to provide a pre-charging current when the dual-cell battery 550 is fully depleted.

Figure 7:
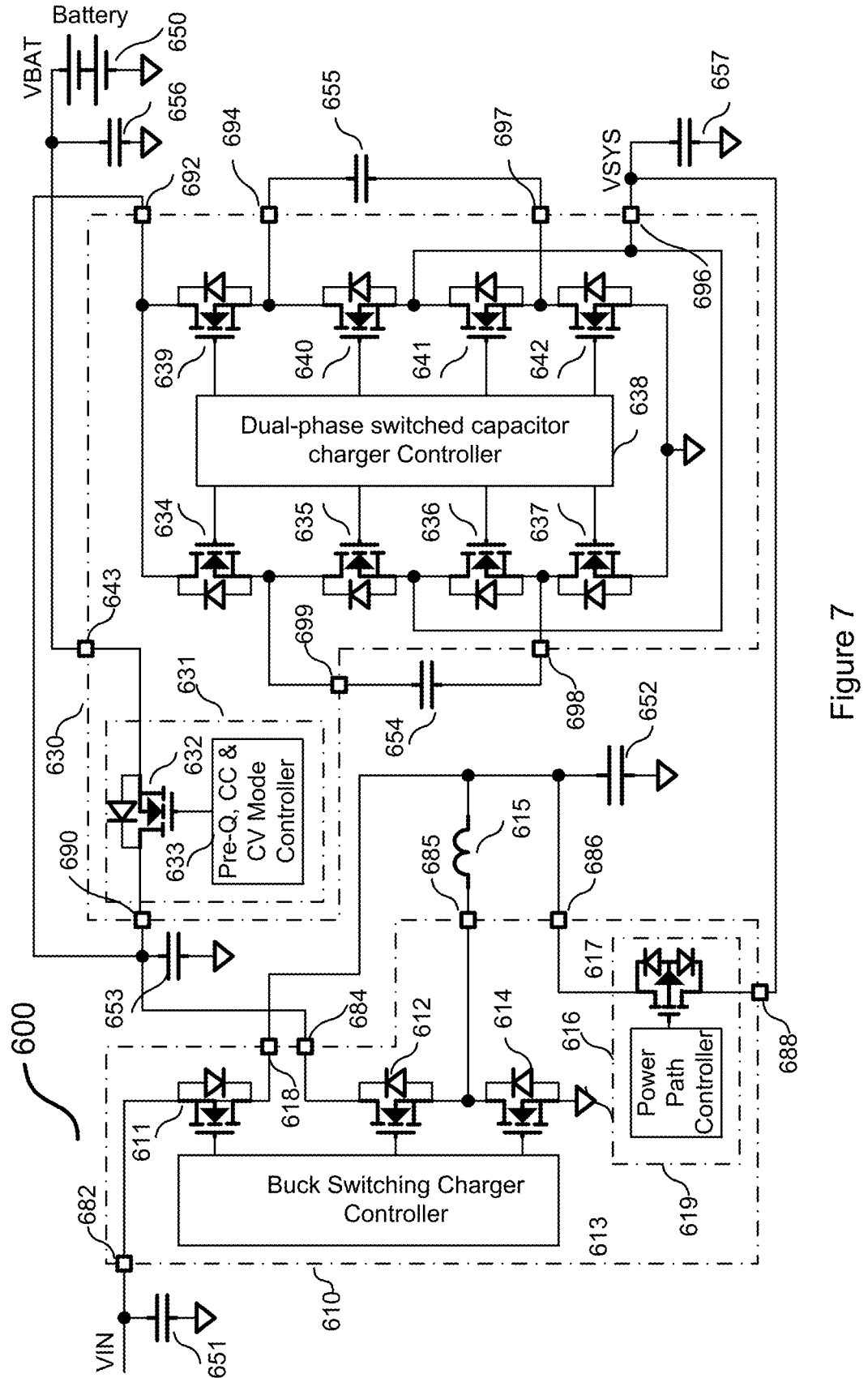
FIG. 7 illustrates a schematic diagram of a second implementation of reconfiguring the battery charging system shown in FIG. 4 as a dual-cell battery charger in accordance with various embodiments of the present disclosure.

FIG. 7 illustrates a schematic diagram of a second implementation of reconfiguring the battery charging system shown in FIG. 4 as a dual-cell battery charger in accordance with various embodiments of the present disclosure. The battery charging system 600 comprises a first subsystem 610 and a second subsystem 630. The first subsystem 610 comprises a switch 611, switches 612 and 614 of a buck switching converter comprising, and a power path management block 619. As shown in FIG. 7, the power path management block 619 comprises a switch 617 and a power path controller 616. The first subsystem 610 further comprises a buck switching charger controller 613 configured to generate gate drive signals for switches 611, 612 and 614.

The first subsystem 610 further comprises a plurality of input/output terminals 618, 682, 684, 685, 686 and 688. As shown in FIG. 7, a capacitor 651 is connected between the input/output terminal 682 and ground. Two input/output terminals 618 and 686 are connected together and further coupled to a capacitor 652. An inductor 615 is connected between two input/output terminals 685 and 686. The input/output terminal 684 is connected to a capacitor 653. An input/output terminal 688 is connected to VSYS and a capacitor 657.

The second subsystem 630 comprises a linear charger 631 and switches 634, 635, 636, 637, 639, 640, 641 and 642 of a switched capacitor converter. As shown in FIG. 7, the linear charger 631 comprises a switch 632 and a controller 633. The second subsystem 630 further comprises a dual-phase switched capacitor charger controller 638 configured to generate gate drive signals for the switches of the switched capacitor converter.

The second subsystem 630 further comprises a plurality of input/output terminals 692, 694, 696, 697, 698, 699, 690 and 643. As shown in FIG. 7, a first flying capacitor 654 is connected between terminals 698 and 699. A second flying capacitor 655 is connected between terminals 694 and 697. Two input/output terminals 690 and 692 are connected together and further coupled to the capacitor 653. The input/output terminal 643 is connected to the dual-cell battery 650 and a capacitor 656. The input/output terminal 696 is connected to VSYS and the capacitor 657.

As shown in FIG. 7, a first terminal (source) of the switch 611 is configured to be connected with a power source VIN. A second terminal (drain) of the switch 611 is configured to be connected with an output terminal of the buck switching converter. As shown in FIG. 7, the connection between the second terminal of the switch 611 and the output terminal of the buck switching converter is implemented through connecting two input/output terminals 618 and 686 using a suitable connection element (e.g., a connection wire/trace). An input terminal of the buck switching converter is configured to be connected with a first terminal (drain of switch 632) of the linear charger 631. An output terminal of the buck switching converter is configured to be connected with an output terminal of the switched capacitor converter through the switch 617. The switch 617 functions as an isolation switch. The first terminal of the linear charger 631 is configured to be connected with an input terminal of the switched capacitor converter. As shown in FIG. 7, the connection between the first terminal of the linear charger 631 and the input terminal of the switched capacitor converter is implemented through connecting two input/output terminals 690 and 692 using a suitable connection element. A second terminal (source of switch 632) of the linear charger 631 is configured to be connected with the dual-cell battery 650.

In operation, the buck switching converter is configured to operate in a boost regulator mode by connecting the output inductor 615 to the input/output terminal 618 and connecting the drain of the switch 612 to the input of the linear charger 631. The output of the linear charger 631 is connected to dual-cell battery 650 directly through the input/output terminal 643. Switches 634 and 639 are also connected to the input (drain of switch 632) of the linear charger 631. In this embodiment, the first subsystem 610 always operates in a reverse boost mode to power up the linear charger 631 during the period of charging the dual-cell battery 650. The first subsystem 610 also provides power for VSYS through the switched capacitor converter of the second subsystem 630. The switched capacitor converter always operates in a 2:1 charge pump mode to power up VSYS either from the dual-cell battery 650 or from the input power source VIN.

The power path management function of the battery charging system 600 is realized by using the linear charger 631. In addition, the linear charger 631 is employed to control the constant current and constant voltage charging modes.

In operation, the switched capacitor converter of the second subsystem 630 is turned off only when there is no input power present at VIN and the dual-cell battery 650 is completed depleted. Under this situation, when a valid input power source is present at VIN, the first subsystem 610 is powered up. The output of the buck switching converter is regulated at a voltage level equal to twice the minimum system operation voltage. The switched capacitor converter of the second subsystem 630 operates in a 2:1 charge pump mode to convert the output voltage of the buck switching converter to the minimum system voltage at VSYS.

In operation, when the dual-cell battery is depleted, the linear charger 631 is configured to operate in a pre-charge mode to charge the depleted battery until the battery voltage reaches a level equal to either twice the minimum system voltage or the battery voltage threshold for entering into the constant current charging mode. In the constant current charging mode, the linear charger 631 is fully turned on to achieve high efficiency. It should be noted that using the linear charger 631 to charge the depleted battery in the pre-charge mode is also applicable to the battery charging system 500 shown in FIG. 6.

In operation, when the dual-cell battery 650 is in a constant current or a constant voltage charging mode, and the supply voltage source at VIN is capable of providing a low voltage USB fast charging (e.g., a USB having an output voltage adjustable from 3.0 V to 5.5 V with 20 mV/step), the buck switching converter of the first subsystem 610 can be turned off and the switch 617 of the power path management block 619 can be fully turned on to supply the system voltage VSYS which is equal to one half of the battery voltage (the voltage across the dual-cell battery 650). The switched capacitor converter of the second subsystem 630 can operate in a 1:2 reverse charge pump mode to provide the charge power to the input of the linear charger 631 to fast charge the dual-cell battery 650.

In operation, if the supply voltage at VIN is removed during the battery charging process, the first subsystem 610 is disabled, and only the second subsystem 630 keeps running to provide power for the system load (e.g., system loads of a smartphone system).

In operation, when the USB OTG operation is requested, the first subsystem 610 is configured to operate in the buck regulator mode. The power switch 611 functions as a USB OTG switch. The switch 611 also provides an OTG output current limit.

Figure 8:
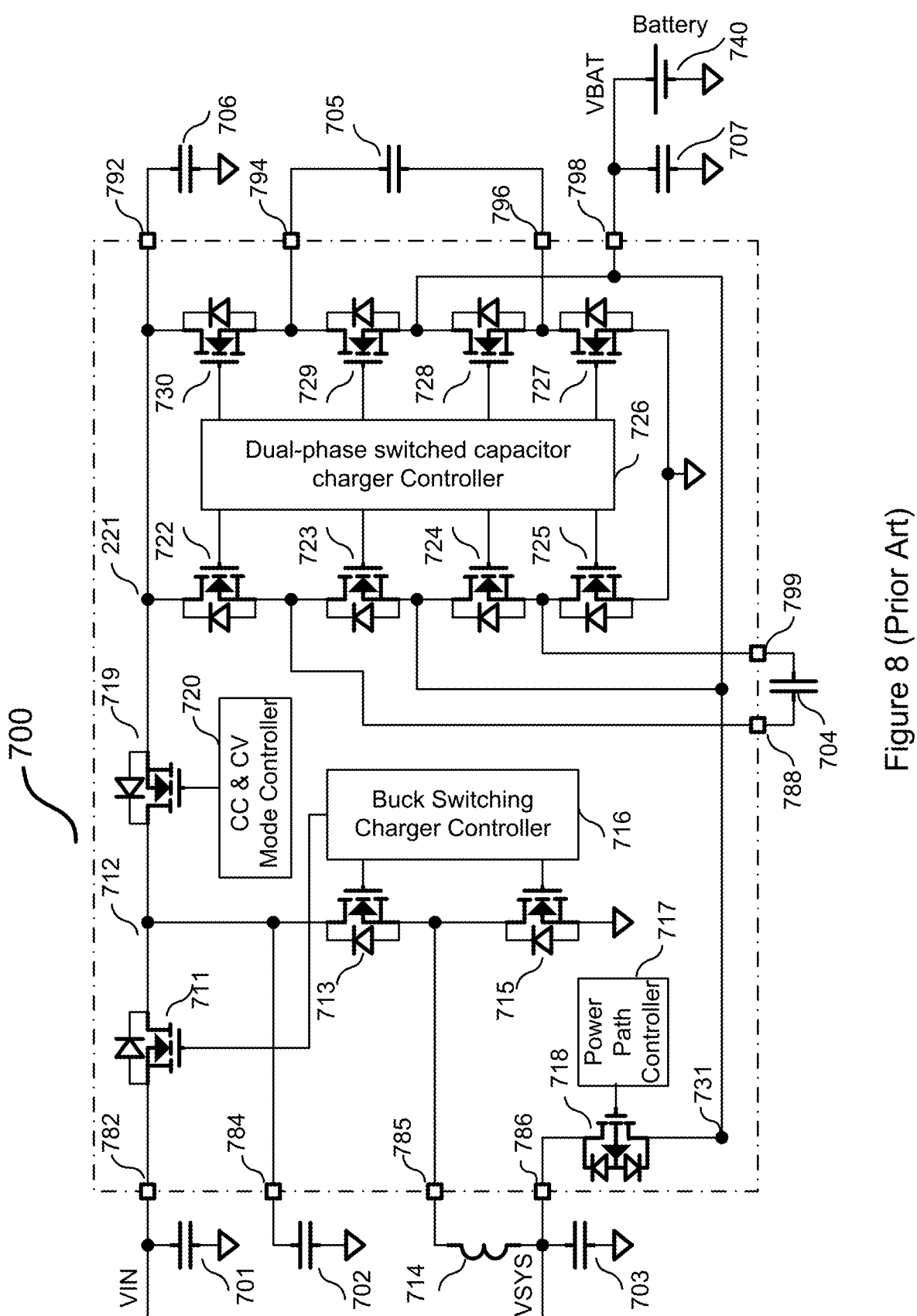
FIG. 8 illustrates a schematic diagram of an integrated battery charging system.

FIG. 8 illustrates a schematic diagram of an integrated battery charging system. The battery charging system 700 includes five function blocks. These five function blocks are integrated on a same apparatus (e.g., an integrated circuit configured to be mounted a PCB). A first function block comprises a switch 711 and part of a buck switching charger controller 716. The first function block provides the battery reverse protection, the USB OTG switch function and the output current limit. A second function block comprises switches 713 and 715 of a buck switching converter. A third function block is a power path management block comprising switch 718 and controller 717. A fourth function block is a linear charger comprising switch 719 and controller 720. A fifth function block comprises switches 722, 723, 724, 725, 727, 728, 729 and 730 of a switched capacitor converter. The battery charging system 700 further comprises an inductor 714, the flying capacitors 704, 705, and the filtering capacitors 701, 702, 706 and 707.

The battery charging system 700 further comprises a plurality of input/output terminals 782, 784, 785, 786, 788, 792, 794, 796, 798 and 799. As shown in FIG. 8, these input/output terminals are used to connect a plurality of capacitors and an inductor with the five function blocks.

Figure 9:
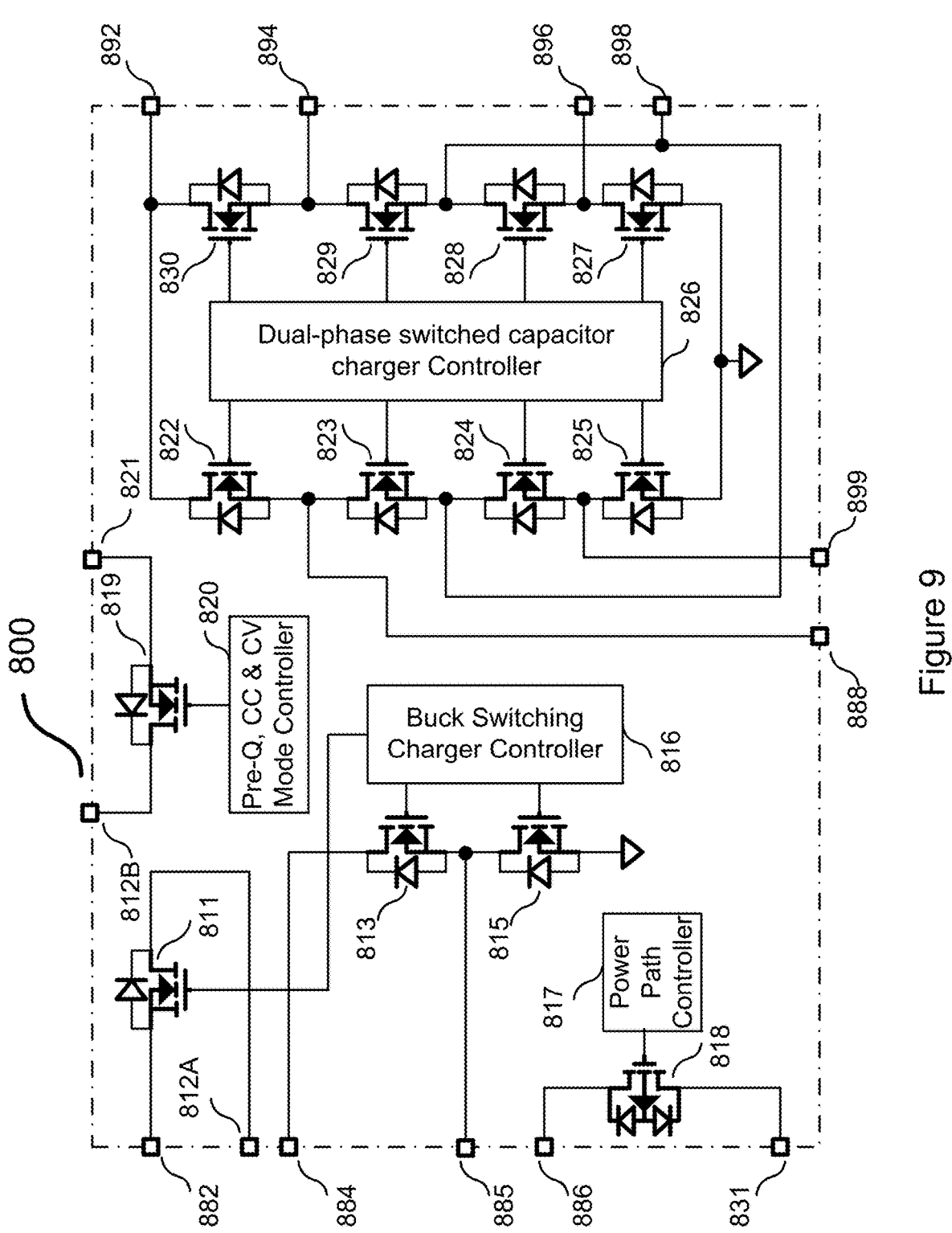
FIG. 9 illustrates a schematic diagram of a second system configuration of the battery charging system shown in FIG. 3 in accordance with various embodiments of the present disclosure.

FIG. 9 illustrates a schematic diagram of a second system configuration of the battery charging system shown in FIG. 3 in accordance with various embodiments of the present disclosure. The battery charging system 800 comprises a switch 811, switches 813 and 815 of a buck switching converter, a power path management block comprising a switch 818 and a controller 817, a linear charger comprising a switch 819 and a controller 820, and switches 822, 823, 824, 825, 830, 829, 828 and 827 of a switched capacitor converter. The battery charging system 800 further comprises a buck switching charger controller 816 configured to generate control signals for switches 811, 813 and 815, and a dual-phase switched capacitor charger controller configured to generate control signals for the switches of the switched capacitor converter.

In some embodiments, the switch 811, the buck switching converter, the power path management block, the linear charger and the switched capacitor converter are integrated on a same apparatus. In some embodiments, this apparatus may be an integrated circuit configured to be mounted on a PCB. As shown in FIG. 9, the apparatus (e.g., an integrated circuit) comprises a plurality of input/output terminals 882, 884, 885, 886, 831, 812A, 812B, 821, 888, 899, 892, 894, 896 and 898.

In comparison with the battery charging system shown in FIG. 8, four newly added input/output terminals 812A, 812B, and 821 and 831 are included in the battery charging system 800. By employing these newly added input/output terminals, the battery charging system 800 is able to charge both the single-cell battery and the dual-cell battery through reconfiguring the system using different connection patterns. In particular, by using a first connection pattern, the system shown in FIG. 9 can be reconfigured as a battery charging system suitable for charging a single-cell battery. The detailed structure and the operating principle of this battery charging system will be described below with respect to FIG. 10. By using a second connection pattern, the system shown in FIG. 9 can be reconfigured as a battery charging system suitable for charging a dual-cell battery. The detailed structure and the operating principle of this battery charging system will be described below with respect to FIG. 11. Furthermore, by using a third connection pattern, the system shown in FIG. 9 can be reconfigured as another battery charging system suitable for charging a dual-cell battery. The detailed structure and the operating principle of this battery charging system will be described below with respect to FIG. 12.

Figure 10:
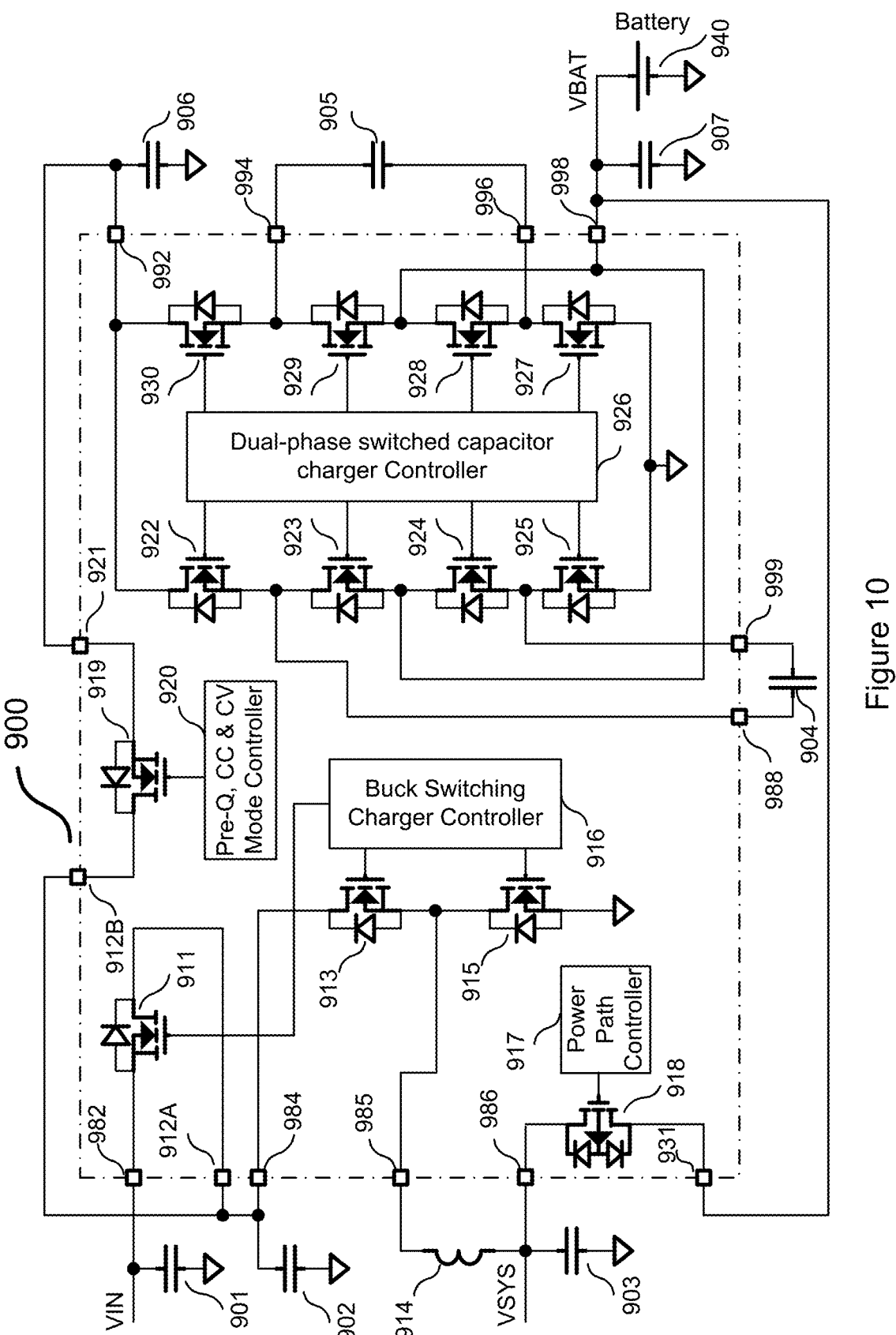
FIG. 10 illustrates a schematic diagram of an implementation of reconfiguring the battery charging system shown in FIG. 9 as a single-cell battery charger in accordance with various embodiments of the present disclosure.

FIG. 10 illustrates a schematic diagram of an implementation of reconfiguring the battery charging system shown in FIG. 9 as a single-cell battery charger in accordance with various embodiments of the present disclosure. The battery charging system 900 comprises a switch 911, switches 913 and 915 of a buck switching converter, a power path management block comprising a switch 918 and a controller 917, a linear charger comprising a switch 919 and a controller 920, and switches 922, 923, 924, 925, 930, 929, 928 and 927 of a switched capacitor converter. As shown in FIG. 10, the battery charging system 900 further comprises a buck switching charger controller 916 configured to generate gate drive signals for switches 911, 913 and 915, and a dual-phase switched capacitor charger controller 926 configured to generate gate drive signals for the switches of the switched capacitor converter.

The battery charging system 900 further comprises a plurality of input/output terminals 982, 984, 986, 931, 912A, 912B, 921, 985, 988, 999, 992, 994, 996 and 998. As shown in FIG. 10, a capacitor 901 is connected between the input/output terminal 982 and ground. Three input/output terminals 984, 912A and 912B are connected together and further coupled to a capacitor 902 and an input (drain of switch 919) of the linear charger. A capacitor 903 is connected between the input/output terminal 986 and ground. An inductor 914 is connected between two input/output terminals 985 and 986. Two input/output terminals 921 and 992 are connected together and further connected to a capacitor 906 and an output (source of switch 919) of the linear charger. As shown in FIG. 10, a first flying capacitor 904 is connected between terminals 988 and 999. A second flying capacitor 905 is connected between terminals 994 and 996. Two input/output terminals 931 and 998 are connected together and further coupled to a capacitor 907 and a single-cell battery 940.

As shown in FIG. 10, a first terminal of the switch 911 is configured to be connected with a power source VIN. A second terminal of the switch 911, an input terminal of the buck switching converter and the first terminal of the linear charger are configured to be connected together. An output terminal of the buck switching converter is configured to be connected with the single-cell battery 940 through the switch 918. In some embodiments, the switch 918 is an isolation switch. A second terminal of the linear charger is configured to be connected with an input terminal of the switched capacitor converter. An output terminal of the switched capacitor converter is configured to be connected with the single-cell battery 940.

The battery charging system 900 is similar to the battery charging system 700 shown in FIG. 8. The operating principle of the battery charging system 900 is not discussed herein again to avoid repetition.

Figure 11:
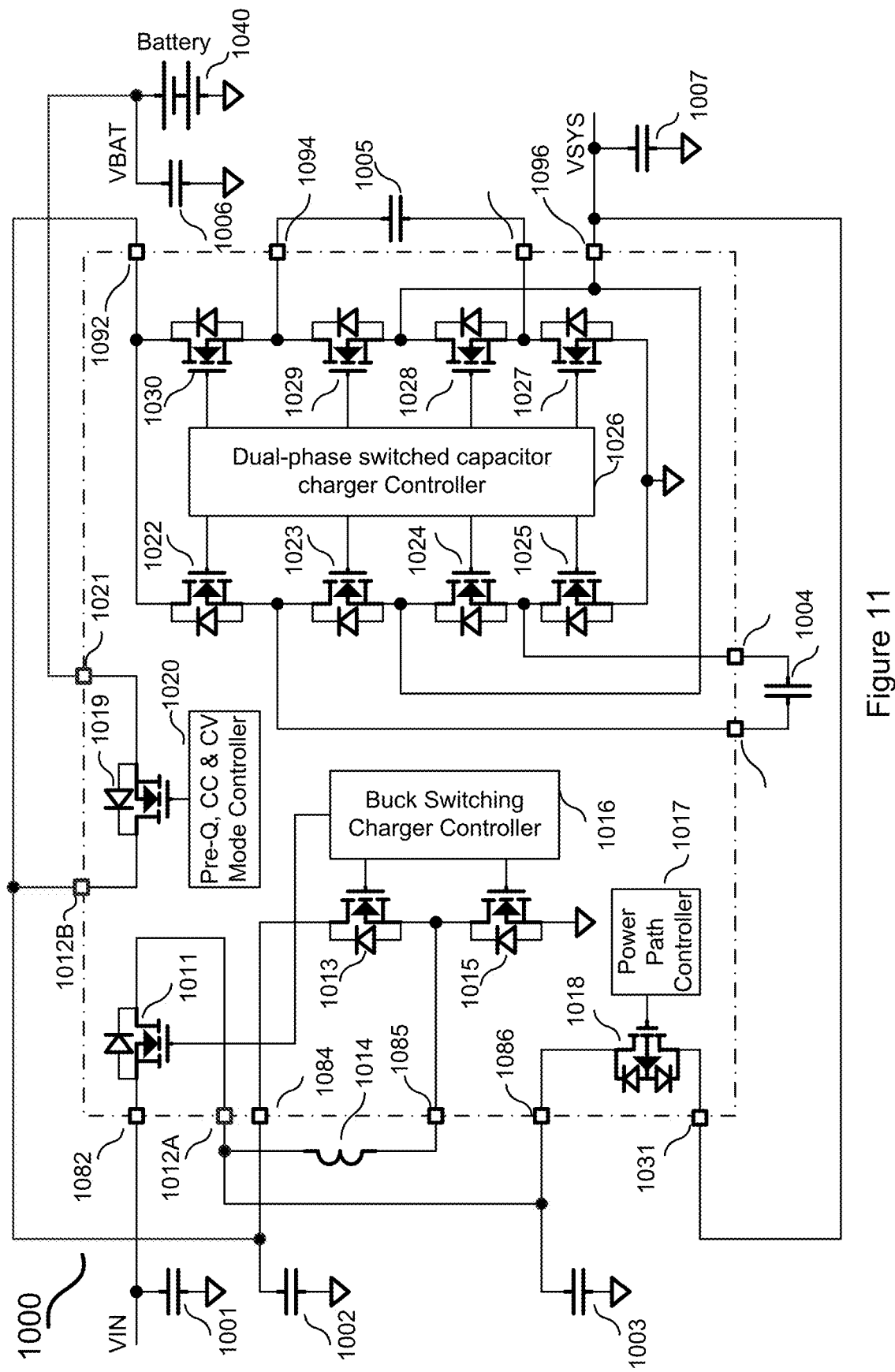
FIG. 11 illustrates a schematic diagram of a first implementation of reconfiguring the battery charging system shown in FIG. 9 as a dual-cell battery charger in accordance with various embodiments of the present disclosure.

FIG. 11 illustrates a schematic diagram of a first implementation of reconfiguring the battery charging system shown in FIG. 9 as a dual-cell battery charger in accordance with various embodiments of the present disclosure. The battery charging system 1000 comprises a switch 1011, switches 1013 and 1015 of a buck switching converter, a power path management block comprising switch 1018 and a controller 1017, a linear charger comprising a switch 1019 and a controller 1020, and switches 1022, 1023, 1024, 1025, 1030, 1029, 1028 and 1027 of a switched capacitor converter. As shown in FIG. 11, the battery charging system 1000 further comprises a buck switching charger controller 1016 configured to generate gate drive signals for switches 1011, 1013 and 1015, and a dual-phase switched capacitor charger controller 1026 configured to generate gate drive signals for the switches of the switched capacitor converter.

The battery charging system 1000 further comprises a plurality of input/output terminals 1082, 1084, 1086, 1031, 1012A, 1012B, 1021, 1085, 1088, 1099, 1092, 1094, 1096 and 1098. As shown in FIG. 11, a capacitor 1001 is connected between the input/output terminal 1082 and ground. Three input/output terminals 1084, 1021B and 1092 are connected together and further coupled to a capacitor 1002 and an input (drain of switch 1013) of the buck switching converter. Two input/output terminals 1012A and 1086 are connected together and further connected to a capacitor 1003 and an output of the buck switching converter. An inductor 1014 is connected between two input/output terminals 1012A and 1085. The input/output terminal 1031 is connected to the input/output terminal 1096. As shown in FIG. 11, a first flying capacitor 1004 is connected between terminals 1088 and 1099. A second flying capacitor 1005 is connected between terminals 1094 and 1096. Two input/output terminals 1021 and 1092 are connected together and further coupled to a capacitor 1006 and a dual-cell battery 1040. The input/output terminal 1098 is connected to a capacitor 1007.

As shown in FIG. 11, a first terminal (source) of the switch 1011 is configured to be connected with a power source VIN. A second terminal (drain) of the switch 1011 is configured to be connected with an output terminal of the buck switching converter. An input terminal (drain of switch 1013) of the buck switching converter, a first terminal (drain of switch 1019) of the linear charger and an input terminal of the switched capacitor converter are configured to be connected together. A second terminal (source of switch 1019) of the linear charger is configured to be connected with the dual-cell battery 1040. An output terminal of the switched capacitor converter is configured to be connected with a system load at VSYS.

In operation, the buck switching converter is configured as a boost converter with the output inductor 1014 connected to the switch 1011 through the newly added input/output terminal 1012A. The input of the buck switching converter is connected to the input (drain of switch 1019) of the linear charger through the newly added input/output terminal 1012B. The output (source of switch 1019) of the linear charger is connected to the dual-cell battery 1040 through the newly added input/output terminal 1021. The power path management block comprises the power path controller 1017 and the switch 1018. The switch 1018 is disabled in the charging process of the dual-cell battery 1040.

In operation, the switched capacitor converter only operates in the 2:1 charge pump mode. The switched capacitor converter is always on regardless of whether the input power source is present at VIN or not. The switched capacitor converter stops running only if no valid input power source is present at VIN and the dual-cell battery 1040 is completely depleted. The operating principle of charging a depleted battery using the battery charging system 1000 is similar to the operating principles of the battery charging systems 500 and 600 described above with respect to FIGS. 6 and 7 respectively, and hence is not repeated herein.

Figure 12:
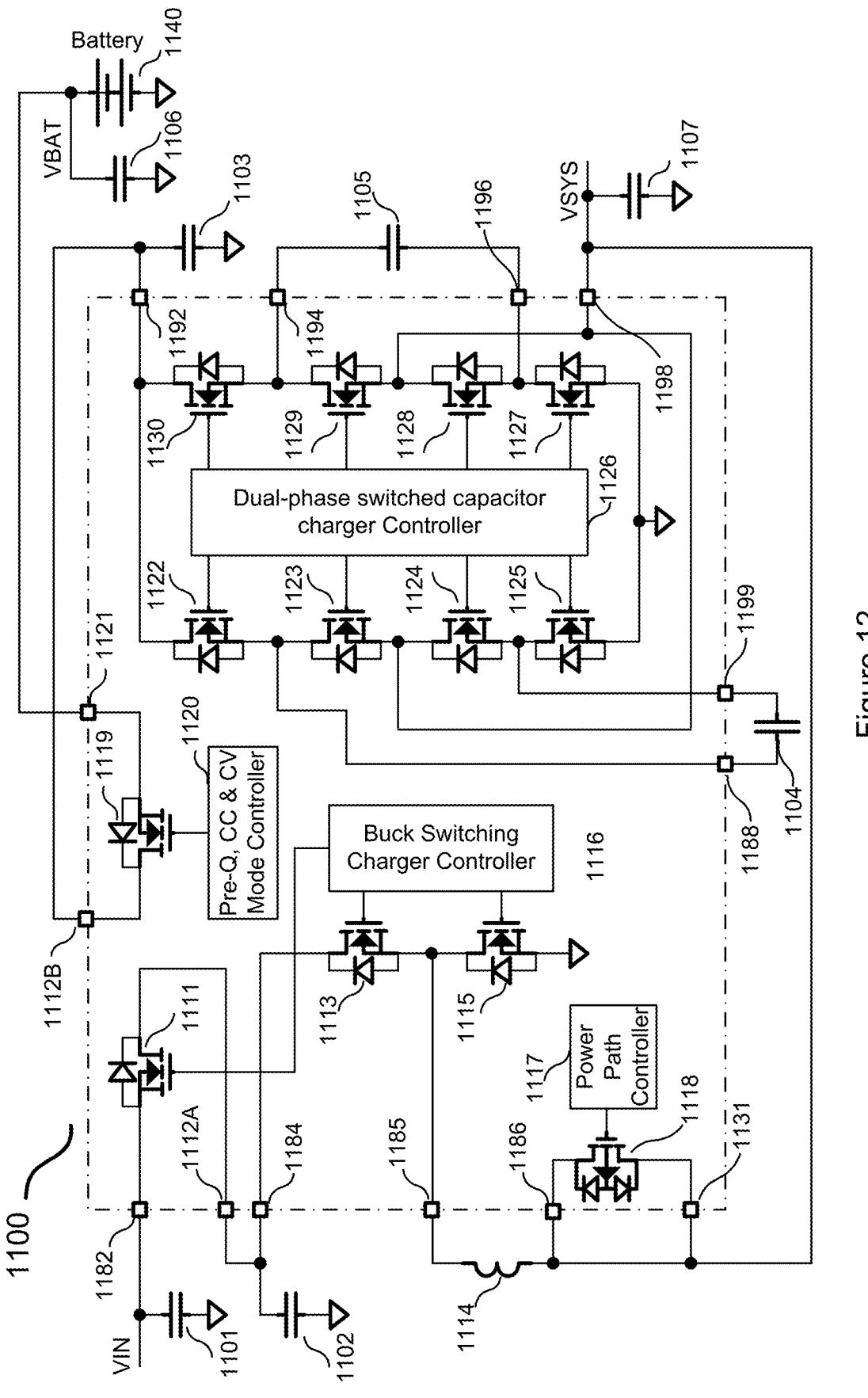
FIG. 12 illustrates a schematic diagram of a second implementation of reconfiguring the battery charging system shown in FIG. 9 as a dual-cell battery charger in accordance with various embodiments of the present disclosure.

FIG. 12 illustrates a schematic diagram of a second implementation of reconfiguring the battery charging system shown in FIG. 9 as a dual-cell battery charger in accordance with various embodiments of the present disclosure. The battery charging system 1100 comprises a switch 1111, switches 1113 and 1115 of a buck switching converter, a power path management block comprising switch 1118 and a controller 1117, a linear charger comprising a switch 1119 and a controller 1120, and switches 1122, 1123, 1124, 1125, 1130, 1129, 1128 and 1127 of a switched capacitor converter. As shown in FIG. 12, the battery charging system 1100 further comprises a buck switching charger controller 1116 configured to generate gate drive signals for switches 1111, 1113 and 1115, and a dual-phase switched capacitor charger controller 1126 configured to generate gate drive signals for the switches of the switched capacitor converter.

The battery charging system 1100 further comprises a plurality of input/output terminals 1182, 1184, 1186, 1131, 1112A, 1112B, 1121, 1185, 1188, 1199, 1192, 1194, 1196 and 1198. As shown in FIG. 12, a capacitor 1101 is connected between the input/output terminal 1182 and ground. Two input/output terminals 1184 and 1112A are connected together and further coupled to a capacitor 1102 and an input (drain of switch 1113) of the buck switching converter. An inductor 1114 is connected between two input/output terminals 1185 and 1186. Two input/output terminals 1186 and 1131 are connected together and further connected to a capacitor 1107 and an output of the buck switching converter. As shown in FIG. 12, a first flying capacitor 1104 is connected between terminals 1188 and 1199. A second flying capacitor 1105 is connected between terminals 1194 and 1196. Two input/output terminals 1112B and 1192 are connected together and further coupled to a capacitor 1103 and the input of the switched capacitor converter. The input/output terminal 1121 is connected to a dual-cell battery 1140.

As shown in FIG. 12, a first terminal (source) of the switch 1111 is configured to be connected with a power source VIN. A second terminal (drain) of the switch 1111 is configured to be connected with the input terminal (drain of switch 1113) of the buck switching converter. An output terminal of the buck switching converter is configured to be connected with an output terminal of the switched capacitor converter and further connected to VSYS. A first terminal (drain of switch 1119) of the linear charger is configured to be connected with an input terminal of the switched capacitor converter. A second terminal (source of switch 1119) of the linear charger is configured to be connected with the dual-cell battery 1140.

The system configuration of the buck switching converter shown in FIG. 12 is similar to that of the buck switching converter shown in FIG. 10 except that the power path management block is shorted by connecting the newly added input/output terminal 1131 to the output inductor 1114 through a connection element (e.g., an external PCB connection). The power path management block is disabled during the charging process of the dual-cell battery 1140.

The input of the switched capacitor converter is connected to the input of the linear charger through the newly added input/output terminal 1112B. The output of the switched capacitor converter (VSYS) is connected to the newly added input/output terminal 1131. The output of the linear charger is connected to the dual-cell battery 1140 through the newly added input/output terminal 1121.

In operation, the buck switching converter is configured to operate in a buck conversion mode when the dual-cell battery 1140 is being charged. The buck switching converter is configured to operate in a reverse boost mode when the USB OTG operation is requested. The USB OTG power is provided at VIN through the switch 1111.

In operation, the switched capacitor converter is configured to operate in both the 1:2 reverse charge pump mode and the 2:1 charge pump mode. Furthermore, the switched capacitor converter is able to have a seamless transition between these two operation modes. The switched capacitor converter is configured to operate in the 1:2 reverse charge pump mode if the dual-cell battery 1140 is being charged. The switched capacitor converter is configured to operate in the 2:1 charge pump mode if there is no valid input power present at VIN and the dual-cell battery 1140 operates in a supplement mode while being charged. The switched capacitor converter always operates regardless of whether the input power is present at VIN or not. The switched capacitor converter stops running only if no valid input power is present at VIN and the dual-cell battery 1140 is completely depleted. The operating principle of charging a depleted battery using the battery charging system 1100 is similar to the operating principles of the battery charging systems 500 and 600 described above with respect to FIGS. 6 and 7 respectively, and hence is not repeated herein.

FIG. 13 illustrates a flow chart of a control method for the battery charger system shown in FIG. 3 in accordance with various embodiments of the present disclosure. This flowchart shown in FIG. 13 is merely an example, which should not unduly limit the scope of the claims. One of ordinary skill in the art would recognize many variations, alternatives, and modifications. For example, various steps illustrated in FIG. 13 may be added, removed, replaced, rearranged and repeated.

Referring back to FIGS. 4 and/or 9, a battery charging system comprises a switch, a buck switching converter, a power path management block, a linear charger and a switched capacitor converter. The switch is a first n-type transistor. A source of the first n-type transistor is the first terminal of the switch. A drain of the first n-type transistor is the second terminal of the switch.

The switched capacitor converter is a dual-phase switched capacitor converter. In the switched capacitor converter, a first switch, a second switch, a third switch and a fourth switch are connected in series between an input terminal of the switched capacitor converter and ground. A first flying capacitor is connected between a common node of the first switch and the second switch, and a common node of the third switch and the fourth switch. A fifth switch, a sixth switch, a seventh switch and an eighth switch are connected in series between the input terminal of the switched capacitor converter and ground. A second flying capacitor is connected between a common node of the fifth switch and the sixth switch, and a common node of the seventh switch and the eighth switch.

The linear charger comprises a second n-type transistor. A drain of the second n-type transistor is the first terminal of the linear charger. A source of the second n-type transistor is the second terminal of the linear charger.

At step 1302, the battery charging system is reconfigured for charging a single-cell battery through applying a plurality of single-cell charging connection patterns to the battery charging system. The plurality of single-cell charging connection patterns includes the connection patterns shown in FIGS. 5 and 10.

At step 1304, the battery charging system is reconfigured for charging a dual-cell battery through applying a plurality of dual-cell charging connection patterns to the battery charging system. The plurality of dual-cell charging connection patterns includes the connection patterns shown in FIGS. 6-7 and 11-12.

Referring back to FIG. 4, the battery charging system comprises a switch, a buck switching converter, a linear charger and a switched capacitor converter. The switch and the switches of the buck switching converter are integrated on a first apparatus. The linear charger and the switches of the switched capacitor converter are integrated on a second apparatus.

Referring back to FIG. 5, reconfiguring the battery charging system for charging the single-cell battery comprises connecting a first terminal of the switch to a power source, connecting a second terminal of the switch to an input terminal of the buck switching converter, connecting an output terminal of the buck switching converter to the single-cell battery through an isolation switch, connecting a first terminal of the linear charger to the power source, connecting a second terminal of the linear charger to an input terminal of the switched capacitor converter, and connecting an output terminal of the switched capacitor converter to the single-cell battery.

Referring back to FIG. 6, reconfiguring the battery charging system for charging the dual-cell battery comprises connecting a first terminal of the switch to a power source, connecting a second terminal of the switch to an input terminal of the buck switching converter, connecting an output terminal of the buck switching converter to an output terminal of the switched capacitor converter, connecting a first terminal of the linear charger to an input terminal of the switched capacitor converter, and connecting a second terminal of the linear charger to the dual-cell battery.

Referring back to FIG. 7, reconfiguring the battery charging system for charging the dual-cell battery comprises connecting a first terminal of the switch to a power source, connecting a second terminal of the switch to an output terminal of the buck switching converter, connecting an input terminal of the buck switching converter to the first terminal of the linear charger, connecting an output terminal of the buck switching converter to an output terminal of the switched capacitor converter through an isolation switch, connecting a first terminal of the linear charger to an input terminal of the switched capacitor converter, and connecting a second terminal of the linear charger to the dual-cell battery.

Referring back to FIG. 9, the battery charging system comprises a switch, a buck switching converter, a linear charger and a switched capacitor converter. The switch, the switches of the buck switching converter, the linear charger and the switches of the switched capacitor converter are integrated on a same apparatus.

Referring back to FIG. 10, reconfiguring the battery charging system for charging the single-cell battery comprises connecting a first terminal of the switch to a power source, connecting a second terminal of the switch, an input terminal of the buck switching converter and a first terminal of the linear charger together, connecting an output terminal of the buck switching converter to the single-cell battery through an isolation switch, connecting a second terminal of the linear charger to an input terminal of the switched capacitor converter, and connecting an output terminal of the switched capacitor converter to the single-cell battery.

Referring back to FIG. 11, reconfiguring the battery charging system for charging the dual-cell battery comprises connecting a first terminal of the switch to a power source, connecting a second terminal of the switch to an output terminal of the buck switching converter, connecting an input terminal of the buck switching converter, a first terminal of the linear charger and an input terminal of the switched capacitor converter together, connecting a second terminal of the linear charger to the dual-cell battery, and connecting an output terminal of the switched capacitor converter to a system load.

Referring back to FIG. 12, reconfiguring the battery charging system for charging the dual-cell battery comprises connecting a first terminal of the switch to a power source, connecting a second terminal of the switch to an input terminal of the buck switching converter, connecting an output terminal of the buck switching converter to an output terminal of the switched capacitor converter, connecting a first terminal of the linear charger to an input terminal of the switched capacitor converter, and connecting a second terminal of the linear charger to the dual-cell battery.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A reconfigurable battery charging system suitable for charging either a single-cell battery or a dual-cell battery, comprising:
   a buck switching converter;
   a switched capacitor converter; and
   a linear charger having a first terminal and a second terminal, wherein power switches of the linear charger and the switched capacitor converter are in a first integrated circuit package mounted on a printed circuit board, and the second terminal of the linear charger is directly connected to a pad on the printed circuit board, and wherein when the reconfigurable battery charging system is configured to charge the single-cell battery, the second terminal of the linear charger is connected to an input terminal of the switched capacitor converter through a first connection trace on the printed circuit board, and the switched capacitor converter is operating at a 2:1 down converting mode to receive current from the linear charger to charge the single-cell battery, and when the reconfigurable battery charging system is configured to charge the dual-cell battery, the first terminal of the linear charger is connected to the input terminal of the switched capacitor converter through a second connection trace on the printed circuit board, and the switched capacitor converter is operating at a 1:2 up converting mode to provide current to the linear charger to charge the dual-cell battery.

2. The reconfigurable battery charging system of claim 1, further comprising:
   a switch having a first terminal connected with a power source and a second terminal connected with an input terminal of the buck switching converter, wherein:
      the switch and switches of the buck switching converter are integrated on a second integrated circuit package.

3. The reconfigurable battery charging system of claim 2, wherein the reconfigurable battery charging system is configured to charge the single-cell battery, and wherein:
   an output terminal of the buck switching converter is configured to be connected with the single-cell battery through an isolation switch;
   the first terminal of the linear charger is configured to be connected with the power source; and
   an output terminal of the switched capacitor converter is configured to be connected with the single-cell battery.

4. The reconfigurable battery charging system of claim 2, wherein the reconfigurable battery charging system is configured to charge the dual-cell battery, and wherein:
   an output terminal of the buck switching converter is configured to be connected with an output terminal of the switched capacitor converter; and
   the second terminal of the linear charger is configured to be connected with the dual-cell battery.

5. The reconfigurable battery charging system of claim 1, further comprising:
   a switch having a first terminal connected with a power source and a second terminal used for the system reconfiguration, wherein:
      the switch and switches of the buck switching converter are integrated on a second integrated circuit package.

6. The reconfigurable battery charging system of claim 5, wherein:
   when the reconfigurable battery charging system is configured to charge the single-cell battery:
      the second terminal of the switch is configured to be connected with an input terminal of the buck switching converter;
      an output terminal of the buck switching converter is configured to be connected with the single-cell battery and an output terminal of the switched capacitor converter through an isolation switch; and
      the first terminal of the linear charger is configured to be connected with the power source; and
   when the reconfigurable battery charging system is configured to charge the dual-cell battery:
      the second terminal of the switch is configured to be connected with the output terminal of the buck switching converter;
      the input terminal of the buck switching converter is configured to be connected with the first terminal of the linear charger;
      the output terminal of the buck switching converter is configured to be connected with the output terminal of the switched capacitor converter through the isolation switch; and
      the second terminal of the linear charger is configured to be connected with the dual-cell battery.

7. The reconfigurable battery charging system of claim 1, further comprising:

a switch having a first terminal connected with a power source and a second terminal connected with an input terminal of the buck switching converter, wherein the switch, switches of the buck switching converter, the linear charger and switches of the switched capacitor converter are integrated on the first integrated circuit package.

8. The reconfigurable battery charging system of claim 7, wherein the reconfigurable battery charging system is configured to charge the single-cell battery, and wherein:

the input terminal of the buck switching converter and the first terminal of the linear charger are configured to be connected together;

an output terminal of the buck switching converter is configured to be connected with the single-cell battery through an isolation switch; and an output terminal of the switched capacitor converter is configured to be connected with the single-cell battery.

9. The reconfigurable battery charging system of claim 7, wherein the reconfigurable battery charging system is configured to charge the dual-cell battery, and wherein:

an output terminal of the buck switching converter is configured to be connected with an output terminal of the switched capacitor converter; and the second terminal of the linear charger is configured to be connected with the dual-cell battery.

10. The reconfigurable battery charging system of claim 1, further comprising:

a switch having a first terminal connected with a power source and a second terminal used for the system reconfiguration, wherein the switch, switches of the buck switching converter, the linear charger and switches of the switched capacitor converter are integrated on the first integrated circuit package.

11. The reconfigurable battery charging system of claim 10, wherein:

when the reconfigurable battery charging system is configured to charge the single-cell battery:

the second terminal of the switch is configured to be connected with an input terminal of the buck switching converter;

an output terminal of the buck switching converter is configured to be connected with the single-cell battery and an output terminal of the switched capacitor converter through an isolation switch; and the first terminal of the linear charger is configured to be connected with the power source; and when the reconfigurable battery charging system is configured to charge the dual-cell battery:

the second terminal of the switch is configured to be connected with the output terminal of the buck switching converter;

the input terminal of the buck switching converter, the first terminal of the linear charger and the input terminal of the switched capacitor converter are configured to be connected together;

the second terminal of the linear charger is configured to be connected with the dual-cell battery; and the output terminal of the switched capacitor converter is configured to be connected with a system load.

12. The reconfigurable battery charging system of claim 10, wherein the switch is a first n-type MOSFET transistor, and wherein:

a source of the first n-type MOSFET transistor is the first terminal of the switch; and a drain of the first n-type MOSFET transistor is the second terminal of the switch.

13. The reconfigurable battery charging system of claim 1, wherein the switched capacitor converter is a dual-phase switched capacitor converter comprising:

a first switch, a second switch, a third switch and a fourth switch connected in series between an input terminal of the switched capacitor converter and ground;

a first flying capacitor connected between a common node of the first switch and the second switch, and a common node of the third switch and the fourth switch;

a fifth switch, a sixth switch, a seventh switch and an eighth switch connected in series between the input terminal of the switched capacitor converter and ground; and a second flying capacitor connected between a common node of the fifth switch and the sixth switch, and a common node of the seventh switch and the eighth switch, and wherein the switched capacitor converter is able to have a seamless transition between the 1:2 up converting mode and the 2:1 down converting mode.

14. The reconfigurable battery charging system of claim 1, wherein the linear charger comprises a second n-type MOSFET transistor, and wherein:

a drain of the second n-type MOSFET transistor is the first terminal of the linear charger; and a source of the second n-type MOSFET transistor is the second terminal of the linear charger, and wherein the linear charger is configured to provide a pre-charge current for charging a depleted battery, and wherein the linear charger is configured to provide a constant voltage for charging a battery in a constant voltage charging mode.

15. A method comprising:

reconfiguring a reconfigurable battery charging system for charging a single-cell battery through applying a plurality of single-cell charging connection patterns to the reconfigurable battery charging system; and reconfiguring the battery charging system for charging a dual-cell battery through applying a plurality of dual-cell charging connection patterns to the reconfigurable battery charging system, wherein the reconfigurable battery charging system comprises a switch, a buck switching converter, a linear charger and a switched capacitor converter, and wherein:

when the reconfigurable battery charging system is configured to charge the single-cell battery, a second terminal of the linear charger is connected to an input terminal of the switched capacitor converter, and the switched capacitor converter is operating at a 2:1 down converting mode to receive current from the linear charger to charge the single-cell battery; and when the reconfigurable battery charging system is configured to charge the dual-cell battery, a first terminal of the linear charger is connected to the input terminal of the switched capacitor converter, and the switched capacitor converter is operating at a 1:2 up converting mode to provide current to the linear charger to charge the dual-cell battery, and wherein the second terminal of the linear charger is directly connected to a pad on a printed circuit board and further connected to the input terminal of the switched capacitor converter through a connection trace on the printed circuit board.

16. The method of claim 15, wherein:

the switch and switches of the buck switching converter are integrated on a second integrated circuit package; and the linear charger and switches of the switched capacitor converter are integrated on a first integrated circuit package.

17. The method of claim 16, wherein reconfiguring the reconfigurable battery charging system for charging the single-cell battery comprises:

connecting a first terminal of the switch to a power source;

connecting a second terminal of the switch to an input terminal of the buck switching converter;

connecting an output terminal of the buck switching converter to the single-cell battery through an isolation switch;

connecting the first terminal of the linear charger to the power source; and connecting an output terminal of the switched capacitor converter to the single-cell battery.

18. The method of claim 16, wherein reconfiguring the reconfigurable battery charging system for charging the dual-cell battery comprises:

connecting a first terminal of the switch to a power source;

connecting a second terminal of the switch to an input terminal of the buck switching converter;

connecting an output terminal of the buck switching converter to an output terminal of the switched capacitor converter; and connecting the second terminal of the linear charger to the dual-cell battery.

19. The method of claim 16, wherein reconfiguring the reconfigurable battery charging system for charging the dual-cell battery comprises:

connecting a first terminal of the switch to a power source;

connecting a second terminal of the switch to an output terminal of the buck switching converter;

connecting an input terminal of the buck switching converter to the first terminal of the linear charger;

connecting an output terminal of the buck switching converter to an output terminal of the switched capacitor converter through an isolation switch; and connecting the second terminal of the linear charger to the dual-cell battery.

20. The method of claim 15, wherein:

the switch, switches of the buck switching converter, the linear charger and switches of the switched capacitor converter are integrated on a same integrated circuit package.

21. The method of claim 20, wherein reconfiguring the reconfigurable battery charging system for charging the single-cell battery comprises:

connecting a first terminal of the switch to a power source;

connecting a second terminal of the switch, an input terminal of the buck switching converter and the first terminal of the linear charger together;

connecting an output terminal of the buck switching converter to the single-cell battery through an isolation switch; and connecting an output terminal of the switched capacitor converter to the single-cell battery.

22. The method of claim 20, wherein reconfiguring the reconfigurable battery charging system for charging the dual-cell battery comprises:

connecting a first terminal of the switch to a power source;

connecting a second terminal of the switch to an output terminal of the buck switching converter;

connecting an input terminal of the buck switching converter, the first terminal of the linear charger and an input terminal of the switched capacitor converter together;

connecting the second terminal of the linear charger to the dual-cell battery; and connecting an output terminal of the switched capacitor converter to a system load.

23. The method of claim 20, wherein reconfiguring the reconfigurable battery charging system for charging the dual-cell battery comprises:

connecting a first terminal of the switch to a power source;

connecting a second terminal of the switch to an input terminal of the buck switching converter;

connecting an output terminal of the buck switching converter to an output terminal of the switched capacitor converter; and connecting the second terminal of the linear charger to the dual-cell battery.

24. The method of claim 20, further comprising:

configuring the buck switching converter to operate in a reverse boost mode with an output inductor current limit.

25. The method of claim 15, further comprising:

detecting a battery configuration; and based on a detected battery configuration, reconfiguring the reconfigurable battery charging system so as to charge both the single-cell battery and the dual-cell battery through using different input/output terminal connection patterns.

\* \* \* \* \*